(12) United States Patent
Deguchi et al.

(10) Patent No.: US 7,529,950 B2
(45) Date of Patent: May 5, 2009

(54) INFORMATION PROCESSING SYSTEM, CONTROL METHOD FOR INFORMATION PROCESSING SYSTEM, AND STORAGE SYSTEM

(75) Inventors: Akira Deguchi, Yokohama (JP); Takashige Iwamura, Yokohama (JP); Yasutomo Yamamoto, Sagamihara (JP); Tetsuya Maruyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 11/283,777

(22) Filed: Nov. 22, 2005

(65) Prior Publication Data

US 2007/0079088 A1 Apr. 5, 2007

(30) Foreign Application Priority Data

Oct. 5, 2005 (JP) ............................. 2005-292842

(51) Int. Cl.
*G06F 1/00* (2006.01)
*G06F 1/32* (2006.01)
*G06F 13/00* (2006.01)

(52) U.S. Cl. .................. 713/300; 713/320; 711/114
(58) Field of Classification Search ................ 713/300, 713/320, 323
See application file for complete search history.

(56) References Cited

U.S. PATENT DOCUMENTS

| 6,408,370 | B2 | | 6/2002 | Yamamoto et al. | |
| 6,496,318 | B1 | | 12/2002 | Sukigara et al. | |
| 6,583,947 | B1 | * | 6/2003 | Hakamata et al. | 360/69 |
| 6,859,882 | B2 | * | 2/2005 | Fung | 713/300 |
| 6,947,240 | B2 | * | 9/2005 | Hakamata et al. | 360/69 |
| 7,131,013 | B2 | * | 10/2006 | Sasakura et al. | 713/300 |
| 7,281,088 | B2 | * | 10/2007 | Yamazaki et al. | 711/114 |
| 7,353,406 | B2 | * | 4/2008 | Yagisawa et al. | 713/300 |
| 2004/0054939 | A1 | * | 3/2004 | Guha et al. | 713/300 |
| 2005/0111249 | A1 | * | 5/2005 | Yagisawa et al. | 365/145 |
| 2005/0160221 | A1 | * | 7/2005 | Yamazaki et al. | 711/114 |

FOREIGN PATENT DOCUMENTS

| JP | 10-83614 | 3/1998 |
| JP | 11-85408 | 3/1999 |
| JP | 2000-293314 | 10/2000 |
| JP | 2005-157710 | 6/2005 |

\* cited by examiner

*Primary Examiner*—Suresh K Suryawanshi
(74) *Attorney, Agent, or Firm*—Antonelli, Terry, Stout & Kraus, LLP.

(57) ABSTRACT

A first storage system comprises an information processing device and a first volume, and is connected to an information processing device. A second storage system comprises a second volume and is connected to the first storage system. The second storage system performs power supply control relating to the second volume in cooperation with a remote copy, such that the remote copy and the power supply control are performed efficiently. Thus, a remote copy function performs power supply control of an HDD comprising a secondary volume of a remote copy pair, to match data copy status (such as stopping data copy to the secondary volume, or differential copying). Thus, longevity of the HOD and lower use of active power of a storage system can be realized.

20 Claims, 27 Drawing Sheets

CALCULATOR 200

WRITE REQUEST 300

VOLUME CONFIGURATION TABLE 500

| VOLUME ID | CAPACITY (G Byte) | PARITY GROUP ID | MAID FLAG | POWER CUT FLAG |
|---|---|---|---|---|
| VOLUME 1 | 300 | PARITY GROUP 1 | true | true |
| VOLUME 2 | 300 | PARITY GROUP 1 | true | false |
| VOLUME 3 | 700 | PARITY GROUP 2 | false | - |
| ... | ... | ... | ... | ... |

RECORD 501

PARITY GROUP TABLE 510

| PARITY GROUP ID | HDD-ID | RAID LEVEL | POWER STATUS | ACTIVE POWER |
|---|---|---|---|---|
| PARITY GROUP 1 | 0 | 1 | ON | 30W |
| | 1 | | | |
| PARITY GROUP 2 | 2 | 5 | OFF | 60W |
| | 3 | | | |
| | 4 | | | |
| | 5 | | | |
| PARITY GROUP 3 | 6 | 1 | - | 30W |
| | 7 | | | |
| ... | ... | ... | ... | ... |

FIG.8

PAIR CONFIGURATION TABLE 1091

| PRIMARY VOLUME ID | SECONDARY VOLUME ID | PAIR STATUS | COUNTERPART STORAGE SYSTEM ID | REMOTE COPY TYPE |
|---|---|---|---|---|
| VOLUME 1 | VOLUME 2 | Duplex | STORAGE SYSTEM 1 | ASYNCHRONOUS |
| VOLUME 3 | VOLUME 4 | Duplex | STORAGE SYSTEM 2 | ASYNCHRONOUS |
| ... | ... | ... | ... | ... |

RECORD 700

FIG.9

| COPIED VOLUME ADDRESS |
|---|
| 2 |

1093

| VOLUME ADDRESS | DIFFERENTIAL BIT |
|---|---|
| 0 | off |
| 1 | off |
| 2 | on |
| 3 | off |
| 4 | on |
| 5 | on |
| ... | ... |

RECORD 800

INFORMATION PROCESSING SYSTEM, CONTROL METHOD FOR INFORMATION PROCESSING SYSTEM, AND STORAGE SYSTEM

The present application is based on and claims priority of Japanese patent application No. 2005-292842 filed on Oct. 5, 2005, the entire contents of which are hereby incorporated by reference.

BACKGROUND OF THE INVENTION

1. Field of the Invention

The present invention relates to an information processing system providing a storage system and a control method of an information processing system providing a storage system, and in particular relates to a technique for extending the uptime of a disk device (hereafter abbreviated to "HDD") and for reducing power consumption of the storage system.

2. Description of the Related Art

Currently, the need for long-term storage of data of business information systems is increasing. The background for this is that, in fields such as banking, medicine, and pharmaceuticals, long-term storage of transaction data or medical data is being required by law.

A conventional long-term data storage media is a tape. However, a tape is easily affected by humidity or dust, and thus the management thereof is difficult compared to an HDD or the like. Further, converting the data stored on the tape to be usable by software requires a longer time than does an HDD.

Recently in particular, HDDs are often used as a storage media for long-term data storage, due to the lower cost per bit of HDDs. In such cases, longevity of the HDD and reduced power consumption of the storage system become the main issues.

In the technique described in Japanese Unexamined Patent Application Publication No. 2000-293314, in an effort to reduce power consumption of the storage system, power to the HDD is stopped or switched to power-saving mode after a predetermined amount of time has passed after access is removed from the host computer.

Next, there is technology for copying data stored in a storage region of a storage system (source storage region) to a storage region (destination storage region) which differs from the source storage region. This is technology for duplicating the data written in the source storage region into the source storage region and the destination storage region (hereafter referred to as "remote copying").

Japanese Unexamined Patent Application Publication No. 11-85408 discloses a technique wherein the data written in the source storage region is written asynchronously in the destination storage region.

The probability of using remote copying and the like for data copying to a storage system for long-term data storage is high. However, in the technique described in Japanese Unexamined Patent Application Publication No. 2000-293314 and Japanese Unexamined Patent Application Publication No. 11-85408, no technique is disclosed for power control during execution of remote copying.

SUMMARY OF THE INVENTION

Accordingly, it is an object of the present invention to provide a method for efficiently executing power control while in the process of remote copying.

To this end, present invention comprises an information processing device, a first storage system having a first volume, such first storage system being connected to the information processing device, and a second storage system having a second volume, such second storage system being connected to the first storage system; wherein with an information processing system which performs remote copying from the aforementioned first volume to the aforementioned second volume, power control is performed relating to the aforementioned second volume by coordinating with a remote copy process.

With the present invention, the remote copy unit can control the power source of the HDD to match the data copy status (such as during data copy stopping to the destination storage region, or during initial copying) to the destination storage region. Thus, compared to conventional art, the longevity of the HDD and the reduction in power expenditures of the storage system can be improved.

BRIEF DESCRIPTION OF THE DRAWINGS

FIG. 8 is a diagram illustrating an example of a pair configuration table;

FIG. 9 is a diagram illustrating an example of a difference management table;

DESCRIPTION OF THE PREFERRED EMBODIMENTS

The embodiment of the present invention will now be described. The embodiment described here is but exemplary, and embodiments of the present invention are not to be restricted thereby.

Figure 1:
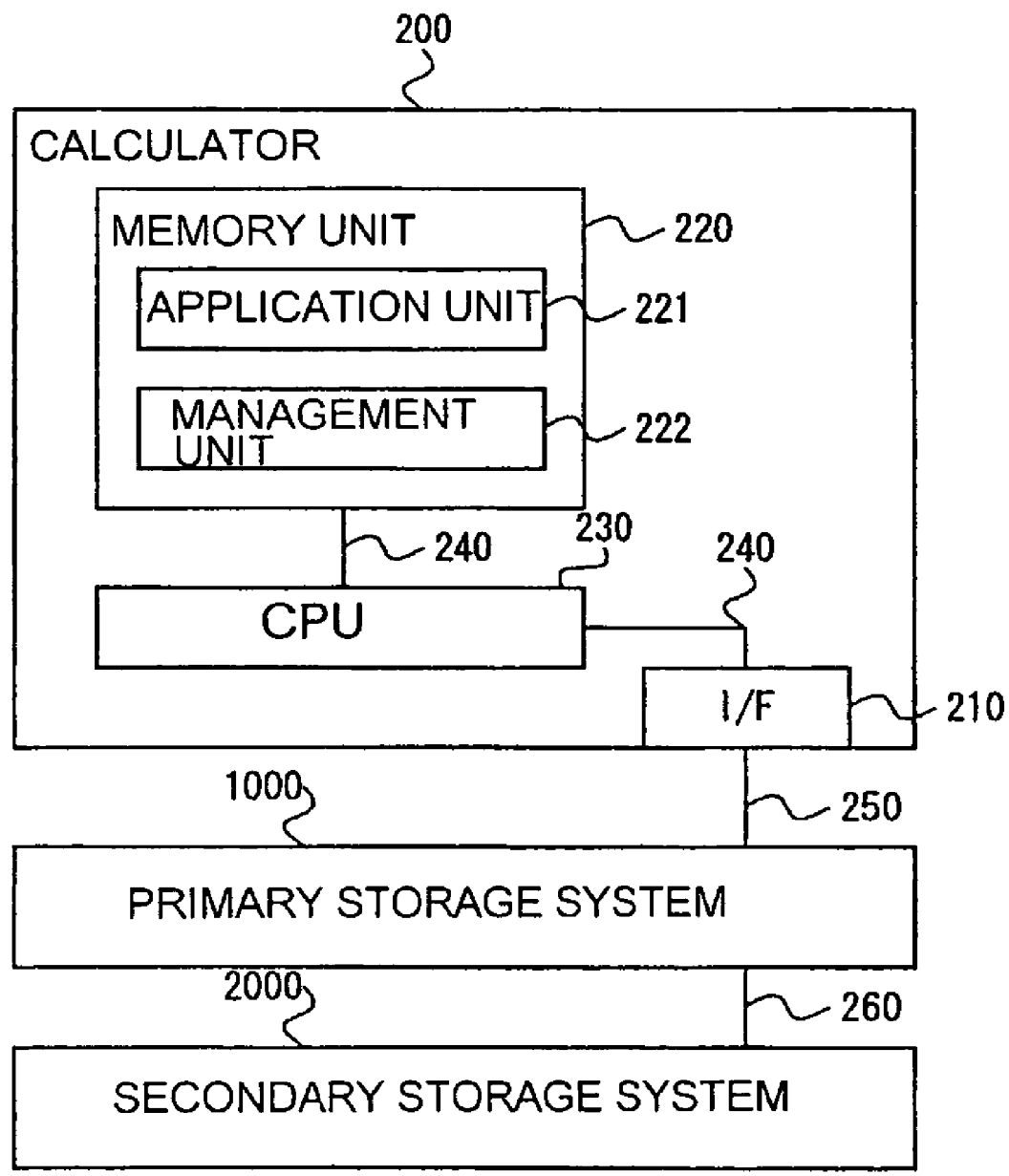
FIG. 1 is a diagram of a configuration of an information processing system and an example of a configuration of a calculator according to a first embodiment of the present invention.

FIG. 1 is a diagram of a system configuration example of an information processing system relating to a first embodiment of the present invention. In FIG. 1, a calculator 200 and a primary storage system 1000 are connected via a network 250. Thus, the calculator 200 can perform a write/read request to the primary storage system 1000. Further, the primary storage system 1000 and a secondary storage system 2000 are connected via a network 260. Thus, the data stored in the primary storage system 1000 can be copied to the secondary storage system 2000. The network 250 and the network 260 can be a multiple number so as to respond to network failure.

The calculator 200 comprises a memory unit 220, CPU 230, and interface 210 (hereafter abbreviated to "I/F"). The CPU 230 and memory unit 220 and I/F 210 are connected by an internal system network 240. On the memory unit 220, software is recorded such as an OS (Operating System), middleware, application unit 221, and management unit 222, and the CPU 230 executes this. The management unit 222 is software for performing various types of settings from the calculator 200 to the primary storage system 1000.

The I/F 210 is an interface for requesting I/O processing such as data writing or reading as to the primary storage system 1000 (hereafter will simply be called the I/O request).

The I/F 210 is connected to the primary storage system 1000 via the network 250. For the network 250, a fiber channel, ATM, or Ethernet or the like can be considered, but any medium can be used which can send and receive I/O requests and the responses thereof between the calculator 200 and the primary storage system 1000.

Figures 4, 5, 6:
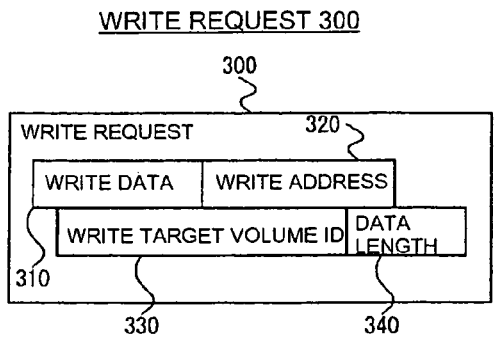
FIG. 4 is a diagram illustrating an example of a write request.
FIG. 5 is a diagram illustrating an example of a volume configuration table.
FIG. 6 is a diagram illustrating an example of a parity group table.

FIG. 4 is a diagram of an example of a write request 300 which is issued from the calculator 200 to the primary storage system 1000. A write data 310, a volume ID 330 for writing which is identification data for the write volume, a write address 320 showing the write position within this write volume, and a data length 340 of the write data 310 are stored within the write request 300 issued from the calculator 200.

Figure 2:
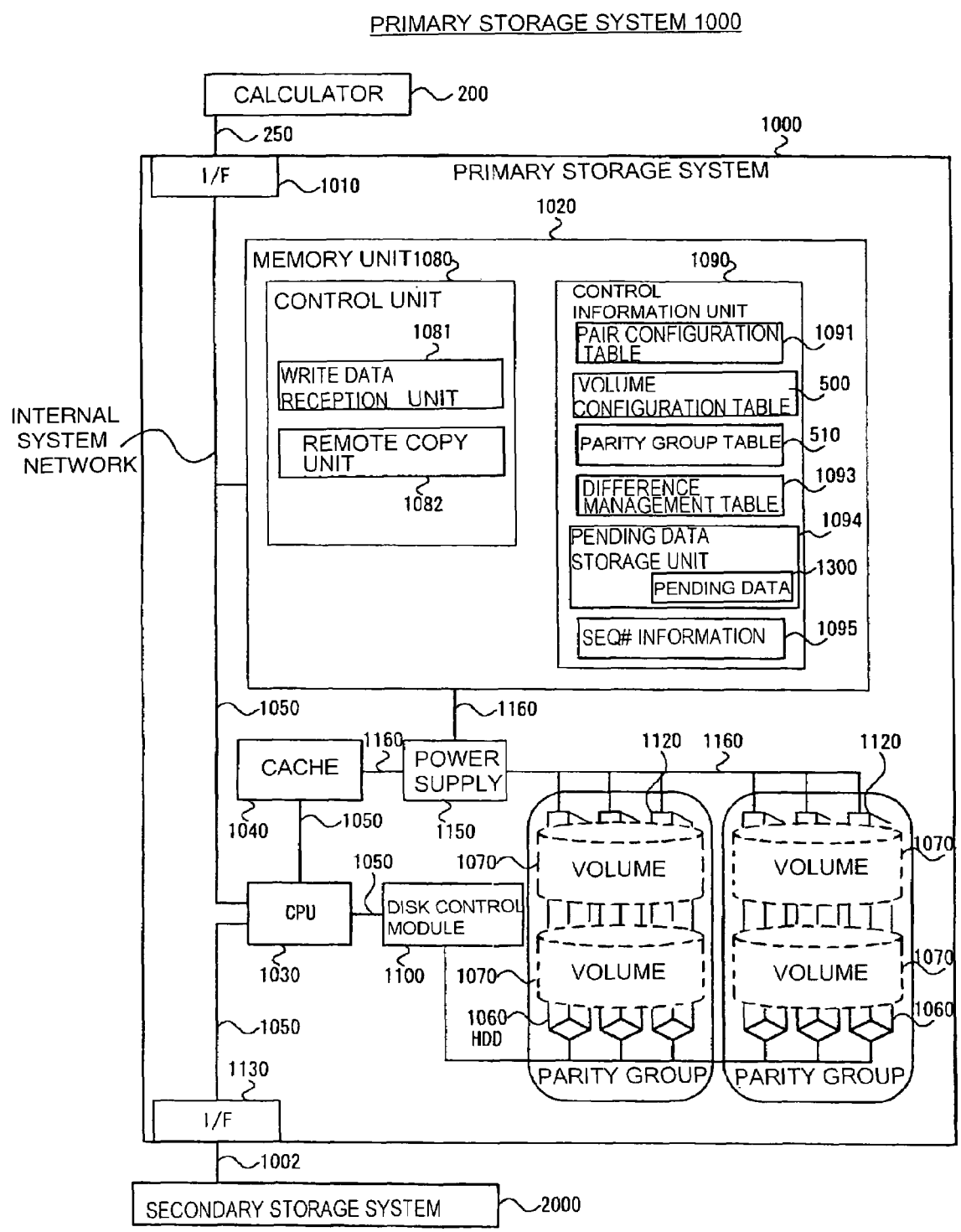
FIG. 2 is a diagram illustrating a configuration example of a primary storage system.
Figure 3:
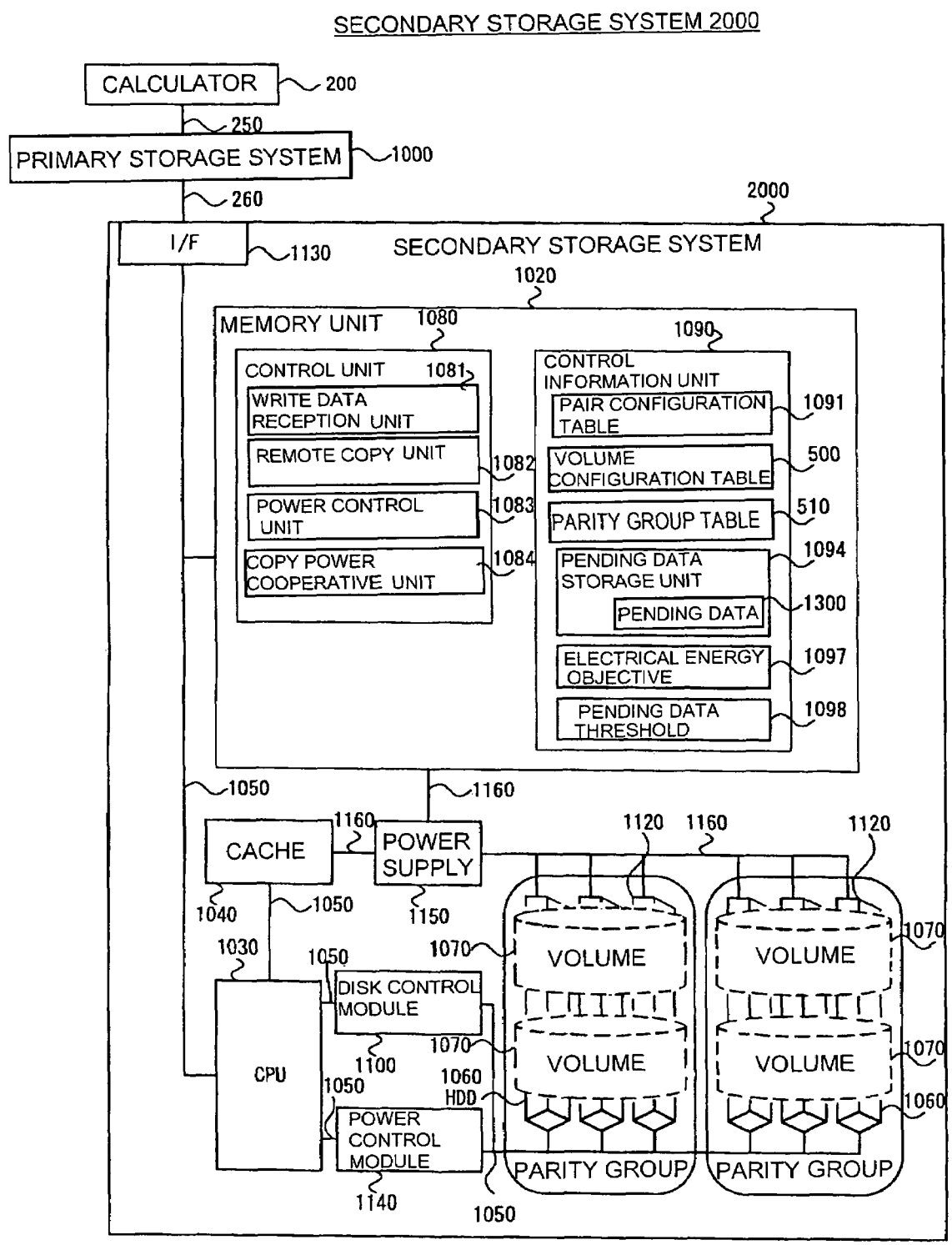
FIG. 3 is a diagram illustrating a configuration example of a secondary storage system.

FIG. 2 illustrates a configuration example of the primary storage system 1000. FIG. 3 illustrates a configuration example of the secondary storage system 2000. Many of the configuration elements and various units of the primary storage system 1000 and the secondary storage system 2000 are identical, and therefore the identical configuration elements and various units are described together as configuration elements and various units of the storage systems 1000/2000. With the present embodiment, the case of remote copying from the primary storage system 1000 to the secondary storage system 2000 is considered. In other words, the primary storage system 1000 has a source volume of the remote copy pair, and the secondary storage system 2000 has a destination volume.

The storage systems 1000 and 2000 are largely divided into the components of a memory unit 1020, CPU 1030, cache 1040, one or more HDD (Hard Disk Drive) 1060, disk control module 1100, I/F 1130, and power supply 1150. The CPU 1030, I/F 1130, cache 1040, memory unit 1020, and disk control module 1100 are connected by the internal system network 1050. Further, the HDD 1060 and the disk control module 1100 are also connected by the internal system network 1050.

Also, the power supply 1150 and the memory unit 1020, cache 1040, and HDD 1060 are connected with a power line 1160. The power supply 1150 supplies a power supply to the memory unit 1020, cache 1040, and HDD 1060 by using a power line 1160.

The cache 1040, by storing high usage frequency data stored in the HDD 1060, is used for increasing processing speed of reading or writing from the calculator 200 compared to the case of storing all data in the HDD. The I/F 1130 is an interface for sending/receiving data or sending/receiving control messages between the primary storage system 1000 and the secondary storage system 2000. Also, the storage systems 1000 and 2000 can have multiple I/Fs 1130.

In the HDD 1060, data is stored which is used by the software executed by the calculator 200. Also, all of the HDD 1060 are connected to the disk control module 1100. One or more HDD 1060 can be bundled together in a unit called a parity group 1120, and have a high reliability with a method such as RAID (Redundant Arrays of Inexpensive Disks). A parity group 1120 formed of one or more HDD 1060 is divided into one or more logical regions, and each can be treated as a logical storage device. A logical storage device is called a volume 1070.

The configuration elements specific to the primary storage system 1000, the various units in the memory unit 1020, and the control information will be described. The primary storage system 1000 has an I/F 1010, in addition to the configuration elements common to the above-mentioned storage systems 1000 and 2000. The I/F 1010 is connected to the CPU 1030 by the network 1050. The I/F 1010 is an interface for accepting I/O requests such as data writing or reading, which is issued from the calculator 200 as to the primary storage system 1000. Also, the storage system 1000 can have a multiple number of I/F 1010.

The memory unit 1020 can be largely divided into a control unit 1080 and a control information unit 1090. The control unit 1080 of the primary storage system 1000 has a write data reception unit 1801 for receiving a write request 300 from the calculator 200, and processing thereof and a remote copy unit 1082 for executing the remote copying. The various units in the control unit 1080 are programs stored in the memory unit 1020, and are executed by the CPU 1030 of the primary storage system 1000. However, a portion or all of these units can all be executed by the hardware.

The control information unit 1090 of the primary storage system 1000 comprises a pair configuration table 1091, volume configuration table 500, parity group table 510, difference management table 1093, pending-data storage unit 1094, and SEQ# information 1095. The pending-data 1300 to be described later is stored in the pending-data storage unit 1094.

Also, the various types of information contained in the control information unit 1090 can also be stored in the volume 1070 to be described later. Also, the pending-data storage unit 1094 of the primary storage system 1000 and the secondary storage system 2000 can be realized by using a portion or all of the cache 1040, but additionally, a portion or all of the regions of the parity group 1120 or the volume 1070 can be used together.

The configuration elements specific to the secondary storage system 2000, the various unit within the memory unit 1020, and the control information will be described. The secondary storage system 2000 has a power control module 1140, in addition to the configuration elements common to the above-described storage systems 1000 and 2000. The power control module 1140 is connected to the control unit and HDD 1060 by the internal network 1050. The power control module 1140 is a module for switching the power supply of the HDD 1060 ON and OFF, based on the instructions from the power control unit 1083 to be described later. Now, in the Specification, turning the power supply ON for all of the HDD 1060 affiliated with a given parity group 1120 is expressed simply as "starting a parity group 1120". Further, turning the power supply OFF for all of the HDD 1060 affiliated with a parity group 1120 is expressed simply as "stopping a parity group 1120". Further, "HDD 1060 power supply OFF" is for the HDD 1060 to make the transition into a movement state to suppress power expenditure, and for example, the rotation of a platter within the HDD 1060 can be stopped, or the power expenditure of the controller within the HDD 1060 can be reduced, or the power supply of the HDD 1060 can actually be stopped. Also, the "HDD 1060 power supply ON" is for the HDD 1060 to return to the movement state so as to process write/read requests normally, from the state of suppressing power consumption.

The memory unit 1020 can be largely divided into a control unit 1080 and a control information unit 1090. The control unit 1080 of the secondary storage system 2000 has a write data reception unit 1801 and a remote copy unit 1082, and these are identical to the various units of the primary storage system 1000. The control unit 1080 of the secondary storage system 2000 further has a power control unit 1083 and a copy-power cooperative unit 1084.

The control information unit 1090 of the secondary storage system 2000 comprises a pair configuration table 1091, volume configuration table 500, parity group table 510, and pending-data storage unit 1094, and these are identical to those of the primary storage system 1000. The control information unit 1090 of the secondary storage system 2000 further has an electrical energy objective 1097 and a pending-data threshold 1098.

The electrical energy objective 1097 will be described. With the embodiment of the present invention, when differential copy of the remote copy pair is performed, power is lowered by limiting the parity groups 1120 to start together to a fixed number, in the secondary storage system 2000. With the present embodiment, the number of starting parity groups 1120 is limited so as to not exceed the value of the electrical energy objective 1097. The electrical energy objective 1097 is to be set in the secondary storage system 2000 by an administrator via management unit 222 or the like.

The pending-data threshold 1098 will be described. With the embodiment of the present invention, the pending-data 1300 transferred from the primary storage system 1000 to the pending-data storage unit 1094 is accumulated to a fixed amount, and in the case that this exceeds the pending-data threshold 1098, controls are in place so that the write data within the pending-data 1300 is written into the destination volume of the secondary storage system 2000. Details will be described when the details of the embodiment of the present invention are described.

The power control module 1140, power control unit 1083, copy-power cooperative unit 1084, electrical energy objective 1097, and pending-data threshold 1098 that are of the secondary storage system 2000 can also be of the primary storage system 1000. Further, the secondary storage system 2000 can also have the difference management table 1093 and the SEQ# information 1095. In that case, remote copying can be performed from the secondary storage system 2000 to the primary storage system 1000.

Remote copying can be created between arbitrary volumes. Also, the embodiment of the present invention controls the power supply of the HDD 1060 comprising the destination volume for remote copying. Thus, the relationship between the volume and the HDD 1060 will be described here. First, as described above, a multiple number of HDD 1060 are collectively known as a unit called a parity group 112, and the parity group table 510 manages this relationship.

Next, the parity group 1120 is divided into one or more logical regions which are the volume 1070, and the volume configuration table 500 manages this relationship. FIG. 6 illustrates one example of a parity group table 510.

The parity group table 510 has, as attributes, a parity group ID, HDD-ID, RAID level, power status, and active power. The parity group ID is assigned as to the parity group 1120, and is information capable of uniquely identifying this parity group 1120. The HDD-ID represents an identifier for the HDD 1060 belonging to the parity group 1120 which is indicated by the parity group ID. The value of the HDD-ID is information capable of uniquely identifying the HDD 1060 in one storage system 1000 or 2000.

The example in FIG. 6 illustrates that an HDD 1060 with an HDD-ID of "0" and an HDD 1060 with an HDD-ID of "1" belong to the parity group "1". The RAID level indicates the level of RAID comprised by the HDD 1060 belonging to the parity group 1120. The power status indicates whether the power supply of the HDD 1060 belonging to the parity group 1120 is ON or OFF. The active power indicates the power necessary for the case wherein the power supply for all HDD 1060 belonging to the parity group 1120 are turned ON.

FIG. 5 illustrates one example of the volume configuration table 500. The volume configuration table 500 has, as attributes, a volume ID, capacity, parity group ID, MAID flag, and power cut flag. The volume ID is assigned as to the volume 1070, and is information capable of uniquely identifying this volume 1070. The capacity indicates the data amount capable of being stored in the volume 1070 which is indicated by the volume ID.

The parity group ID is an ID for the parity group 1120 to which the volume 1070 represented by a volume ID belongs. The MAID flag indicates whether or not the storage systems 1000 and 2000 are capable of controlling the power supply ON/OFF as to the HDD 1060 within the parity group 1120 to which the volume 1070 indicated by a volume ID belongs. In the event that the value of the MAID flag is "true", the storage systems 1000 and 2000 are capable of controlling the power supply ON/OFF as to the HDD 1060. In the event that the value of the MAID flag is "false", the storage systems 1000 and 2000 are not capable of controlling the power supply ON/OFF as to the HDD 1060.

Next, one or more volume 1070 can belong to one parity group 1120. In the example in FIG. 5, a volume 1 and a volume 2 belong to the parity group 1. Thus, there is the case wherein for volume 1, the parity group 1120 is in a status capable of stopping, and for volume 2, the parity group 1120 is in a status not capable of stopping for reasons such as having access to the HDD 1060 within the parity group 1120.

Thus, with the present embodiment, when the volume 1070 uses the parity group 1120, the parity group 1120 is declared as being used, by changing the power cut flag to "false". Also, by changing the power cut flag to "true", the parity group 1120 is declared as not being used.

Also, with the present embodiment, the power cut flags of all of the volumes belonging to the same parity group 1120 are referenced, and in the event that all are "true", the power supply for all of the HDD 1060 within the parity group 1120 are controlled so as to be turned OFF.

Further, in the event that at least one or more power cut flags are "false", the power supply for all of the HDD 1060 within the parity group 1120 are controlled so as not to be turned OFF.

Also, in the event that a MAID flag is "false", power control of the HDD 1060 which comprises the volume 1070 is impossible. This the power cut flag in this event is constantly set as "false".

The record 501 is information comprised of a volume ID, capacity, parity group ID, MAID flag, and power cut flag relating to one volume 1070. With the present embodiment, a volume 1070 is set from an HDD 1120 based on the above information, and is provided to the calculator 200.

Figure 7:
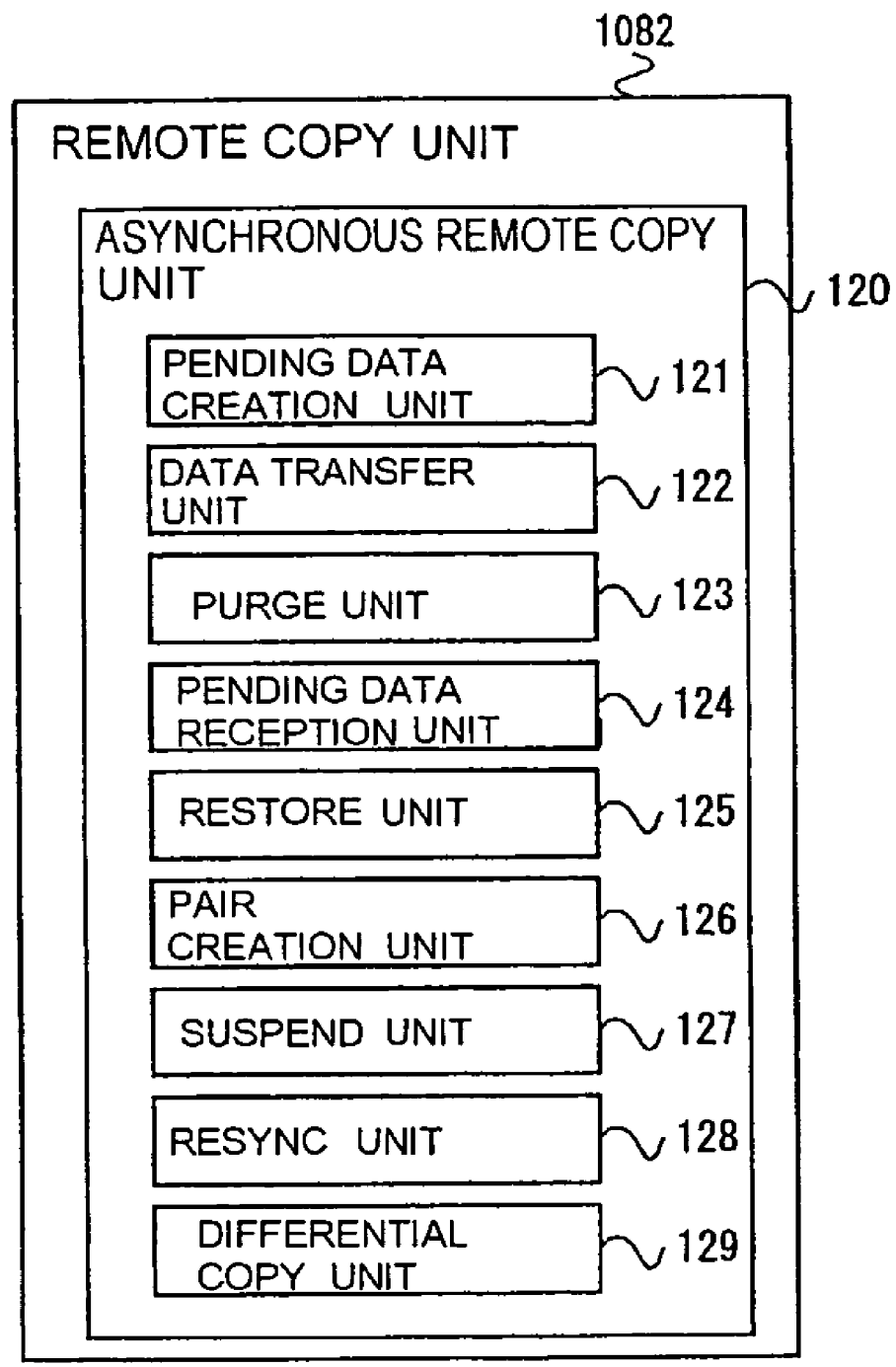
FIG. 7 is a diagram illustrating a configuration example of a remote copy unit.

Now, an outline of the remote copying will be described. FIG. 7 illustrates an example of the configuration of the remote copy unit 1082. Generally speaking, remote copying can be either synchronous remote copying or asynchronous remote copying, but the present embodiment will be described solely as asynchronous remote copying. Thus, the remote copy unit 1082 is formed with an asynchronous remote copy unit 120. The asynchronous remote copy unit 120 comprises a pending-data creation unit 121, data transfer unit 122, purge unit 123, pending-data reception unit 124, restore unit 125, pair creation unit 126, suspend unit 127, resync unit 128, and differential-copy unit 129. The various units of the asynchronous remote copy unit 1082 will be described later. Here, the outline of the asynchronous remote copying will be described.

Remote copying can be created between arbitrary volumes. In the descriptions hereafter, the volume 1070 which is to be the source of the remote copying will be called the primary volume, and the volume 1070 which is to be the destination of the remote copying will be called the secondary volume. The storage system having the source volume is called the primary storage system, and the storage system having the destination volume is called the secondary storage system. Further, the pair of source volume and destination volume are called a remote copy pair.

When the primary storage system 1000 receives a write request 300 from the calculator 200, remote copying is executed by starting the remote copy unit 1082 in the event that there is a remote copy pair wherein the volume for writing is the primary volume. Determination is made as to whether or not there is a remote copy pair wherein the volume for writing is the primary volume by using the pair configuration table 1091.

FIG. 8 illustrates an example of the pair configuration table 1091. The pair configuration table 1091 has, as attributes, a primary volume ID, secondary volume ID, pair status, counterpart storage system ID, and remote copy type. The primary volume ID is assigned as to the primary volume of the remote copy pair, and is identification information capable of uniquely identifying this volume within the primary storage system 1000. The secondary volume ID is assigned as to the secondary volume of the remote copy pair, and is identification information capable of uniquely identifying this volume within the secondary storage system 2000.

The pair status shows the status of the remote copy pair defined as to the primary volume and the secondary volume (there are Initial-copying, Duplex, Duplex-pending, and Suspend status, but these will be described later).

The counterpart storage system ID is an ID for the secondary storage system 2000 with the primary storage system 1000 having a primary volume, and is an ID for the primary storage system 1000 with the secondary storage system 2000 having a secondary volume. The remote copy type indicates the type of remote copying defined between the two volumes represented by a primary volume ID and a secondary volume ID, and acquires either a synchronous or an asynchronous value.

The record 700 is information formed from a primary volume ID, secondary volume ID, pair status, counterpart storage system ID, and remote copy type relating to one remote copy pair. In other words, the pair configuration table 1091 is a collection of records 700.

The usage method for remote copying will be described below. First, the user issues remote copy pair creation command to the primary storage system 1000 from the management unit 222 of the calculator 200 or the like. The primary storage system 1000 receiving the remote copy pair creation command copies all of the data stored in the primary volume to the secondary storage system (initial copy), for the data stored in the primary volume and secondary volume to be identical.

Further, the primary storage system 1000 receiving the remote copy pair creation command adds a record 700 comprising a primary volume ID, secondary volume ID, pair status, counterpart storage system ID, and remote copy type to the pair configuration table 1091. Thus, in the event that the primary storage system 1000 receives a write request 300 as to the primary volume of the newly formed remote copy pair from the calculator 200, the remote copy unit 1082 is set to start. In other words, by asynchronously transferring the write data 310 of the write request 300 to the secondary volume, the data stored in the primary volume and secondary volume can be kept identical. The pair status of when the remote copy pair creation command is received and until the initial copy is completed is called Initial-Copying status.

When the initial copying is completed, the pair status of the remote copy pair is changed to Duplex status. When the primary storage system 1000 receives a write request 300 as to the primary volume of the remote copy pair in Duplex status from the calculator 200, the asynchronous remote copy unit 120 writes in the write data 310 into the secondary volume of the secondary storage system 2000 asynchronous with the timing of receiving the write request 300.

Duplex status is a status wherein the content of the primary volume and the content of the secondary volume are identical, except for data during transfer from the primary storage system 1000 to the secondary storage system 2000, and data not yet transferred. However, for example, in the event of an identifier unique to each volume being stored in the volume, in specific regions with in the volume wherein such identifiers are stored, there is a case that the data content of the primary volume and secondary volume do not need to be identical. Such sameness will be called "synchronous state" in the description hereafter.

A method for writing in the write data 310 asynchronously from the write request 300, from the primary storage system 1000 to the secondary storage system 2000, will be described below. As to a data copy method for the asynchronous remote copy unit 120 to execute from the primary volume to the secondary volume, (1) the primary storage system 1000 creates pending-data 1300 which contains write data 310, write address 320 and the like during the write request, each time a write request 300 is received, and an acknowledgment of writing is forwarded to the calculator 200. (2) the primary storage system 1000 transfers the pending-data 1300 to the secondary storage system 2000, at a timing independent from the acknowledgment of writing to the calculator 200. (3) The secondary storage system 2000 writes in write data 310 into the secondary volume, based on the write address 320 which is contained in the pending-data 1300 received from the primary storage system 1000. Such methods can be considered.

Further, as a modification of the present embodiment, the information regarding the order in which the primary storage system 1000 received the write requests 300 (this is the SEQ# Information 1095 to be described later) is provided to the pending-data 1300. Further, with the secondary storage system 2000, the secondary storage system 2000 writes in the write data 310 into the secondary volume in the order in which the primary storage system 1000 received the write requests 300, using this order information.

In other words, with the asynchronous remote copying according to the present embodiment, pending-data 1300 not yet transferred to the secondary storage system 2000 is accumulated in the pending-data storage unit 1094 in the primary storage system 1000. Further, also with the secondary storage system 2000, the pending-data 1300 is temporarily stored in the pending-data storage unit 1094 of the secondary storage system 2000, and afterwards the write data within the pending-data 1300 is written into the secondary volume.

Also, in order to further improve efficiency of the asynchronous remote copy unit 120, in the event that a write request 300 is issued multiple times within a given time frame as to the same address in the primary volume, the pending-data 1300 regarding all write requests 300 are not transferred to the secondary storage system 2000, but only the pending-data 1300 as to the last write request 300 issued within this time frame can be transferred to the secondary storage system 2000.

Also, in the event that the storage systems 1000 and 2000 have a cache 1040, a pointer showing a storage region on the cache 1040 in the primary storage system 1000 wherein the write data 310 is stored is provided to the pending-data 1300, and using the write data 310 of the cache 1040 being updated by a separate write request 300 as momentum, the write data 310 can be copied from the cache 1040 to the pending-data storage unit 1094, and the write data 310 can be provided to the pending-data 1300. In other words, the data copying for the purpose of pending-data 1300 creation can be delayed until immediately prior to the updating of the write data 310 on the cache 1040 of the primary storage system 1000. Thus, the write data of the pending-data 1300 and the write data on the cache can be shared.

Next, the suspend command for the remote copy pair can be issued from the calculator 200 to the primary storage system. This is a command to pause the transferring of data from primary volume to the secondary volume. Thus, the data transfer from the primary volume to the secondary volume is paused, and the pair status of the remote copy pair wherein identicalness of the primary volume and secondary volume is no longer guaranteed is called Suspend status.

When the primary storage system receives the write request 300 as to the primary volume of the remote copy pair which is in Suspend status, the write address 320 in the write request 300 can be recorded in the difference management table 1093. In other words, the address is recorded wherein data is stored that differs between the primary volume and the secondary volume. By using this difference management table 1093, in the event that the primary volume and the secondary volume are to be in a synchronous state again, only the regions wherein the data stored between the primary volume and the secondary volume differs can be copied (this is called differential-copying).

From the calculator 200, resync command can be issued for causing the primary volume and the secondary volume of the remote copy pair in Suspend status to be in a synchronous state again. As previously described, this can be realized through differential copying. The resync command of the remote copy pair is received, and the pair status until the differential copying is completed is called Duplex-Pending status. Also, after differential copying is completed, and the data content stored between the primary volume and the secondary volume is in a synchronous state, the pair status makes transition to the Duplex status.

In the descriptions above, Initial-Copying status and Duplex-Pending status have been separate status, but these can be displayed and transitioned together as one status. In the present embodiment, Initial-Copying status and Duplex-Pending status are treated together as Duplex-Pending status. Further, with the present embodiment, the initial copying which is executed in the Initial-Copying status and the differential copying which is executed in the Duplex-Pending status are treated together as differential copying. In other words, initial copying is treated as that wherein all addresses in the primary volume are recorded in the difference management table 1093.

Next, the difference management table 1093 wherein the write address 320 of the write request 300 are recorded, when the write request 300 as to the primary volume of the remote copy pair in Suspend status is received from the calculator 200, will be described. FIG. 9 illustrates an example of the difference management table 1093.

First, the volume address is a number wherein the entire region of the volume is divided into small regions of a fixed size and numbers are given from the top of the small regions. The differential bit shows whether or not the small regions indicated by the volume address have been updated by the calculator 200, during Suspend status. The value of the differential bit being "on" shows that it has been updated, and the value of the differential bit being "off" shows that it has not been updated. The pair of differential bits as to the volume address and this address are called the record 800. The difference management table 1093 are formed of a collection of records 800.

The event that there is more than one record 800 wherein the differential bit is "on", the difference is expressed as being recorded. Further, for a given difference management table 1093, in the event that all of the records 800 have the differential bit "off", the difference is expressed as not being recorded. Also, changing the differential bit of the record 800 of the difference management table 1093 to "on" is expressed as recording the difference in the difference management table 1093.

Lastly, the copied volume address is used for the differential copying to distinguishing between copied regions and not yet copied regions. The copied volume address shown in FIG. 9 has completed differential copying relating to the volume addresses "0" and "1", and volume address "2" is in the copy process, and volume address "3" and thereafter have not completed differential copying. The details of the differential copy unit 129 which executes differential copying using the difference management table 1093 will be described later.

Figure 10:
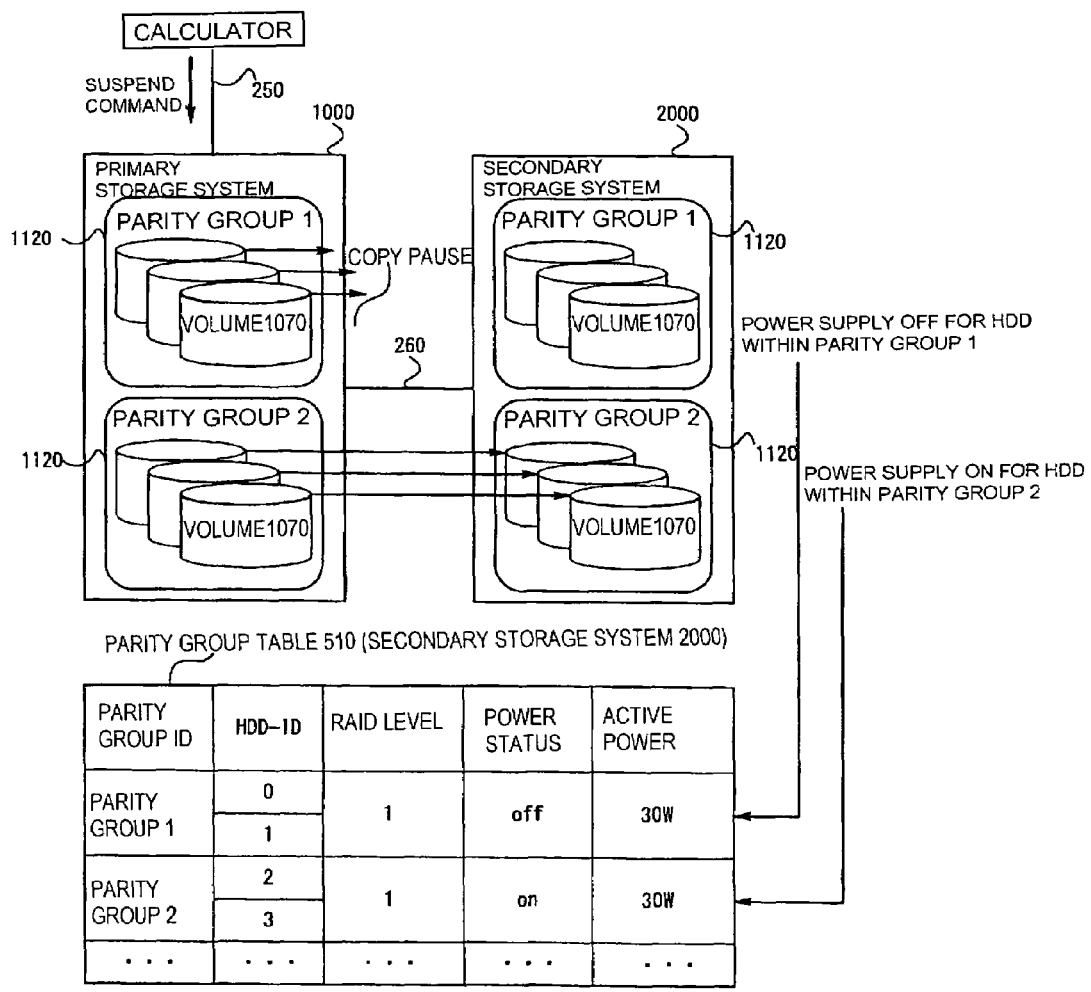
FIG. 10 is a schematic diagram of a first embodiment of the present invention.

An synopsis of the embodiment of the present invention will be stated. The features of the first embodiment of the present invention (power control coordinating with the suspend instructions of the remote copying) are illustrated in FIG. 10. As described in the outline description of remote copying, in the event that the pair status of remote copying is in Suspend status, the write data 310 contained in the write request 300 as to the primary volume is not written into the secondary volume. Further, in the event that the secondary storage system 2000 is a storage system for long-term data storage, the configuration may be such that the calculator is not connected to the secondary storage system 2000, and therefore, there may not be many cases of using the secondary volume immediately following the start of Suspend status. The features of the invention illustrated in FIG. 10 efficiently perform power control, using such a background.

First, the primary storage system 1000 receives a suspend command as to the remote copy pair from the calculator 200. The example in FIG. 10 illustrates the case of three remote copy pairs belonging to parity group 1 being suspended. When the suspend request is received, the remote copy unit 1082 of the primary storage system 1000 stops transferring the pending-data 1300 from the primary storage system 1000 to the secondary storage system 2000. At this stage, new pending-data 1300 does not reach the secondary storage system 2000. Next, after the remote copy unit 1082 of the secondary storage system 2000 writes the write data of the pending-data 1300 accumulated in the secondary storage system 2000 into all the secondary volumes, the power supply of the HDD 1060 within the parity group 1 to which the secondary volumes belong is turned OFF.

The content of the parity group table 510 at this time is shown at the bottom of FIG. 10, and the power status of the parity group 1 to which the secondary volume of the suspended remote copy pair belongs is turned OFF. Also, the three remote copy pairs belonging to the parity group 2 has the data copy extended from the primary volume to the secondary volume, and thus the power status for the parity group 2 is left ON.

Thus, by controlling the power supply of the HDD 1060 to match the operation for suspending the remote copy pair, immediately following the secondary storage system 2000 recognizing that there will be no I/O occurring thereafter, the power supply of the HDD 1060 comprising the secondary volume can be turned OFF, and compared to conventional art, further extension of longevity of the HDD 1060 and reduced power consumption of the storage system 2000 can be realized.

Next, the features of the second embodiment of the present invention (power control considering a network bandwidth between the storage systems) will be described. Generally, transfer bandwidth of the network 260 between primary storage system 1000 and the secondary storage system 2000 is a value smaller than the total of the transfer bandwidths of all of the HDDs 1060 of the primary storage system 1000 or secondary storage system 2000. In the feature described below, the number of HDDs 1060 turned ON during Initial copying or differential copying is reduced, using this tendency.

Figure 11:
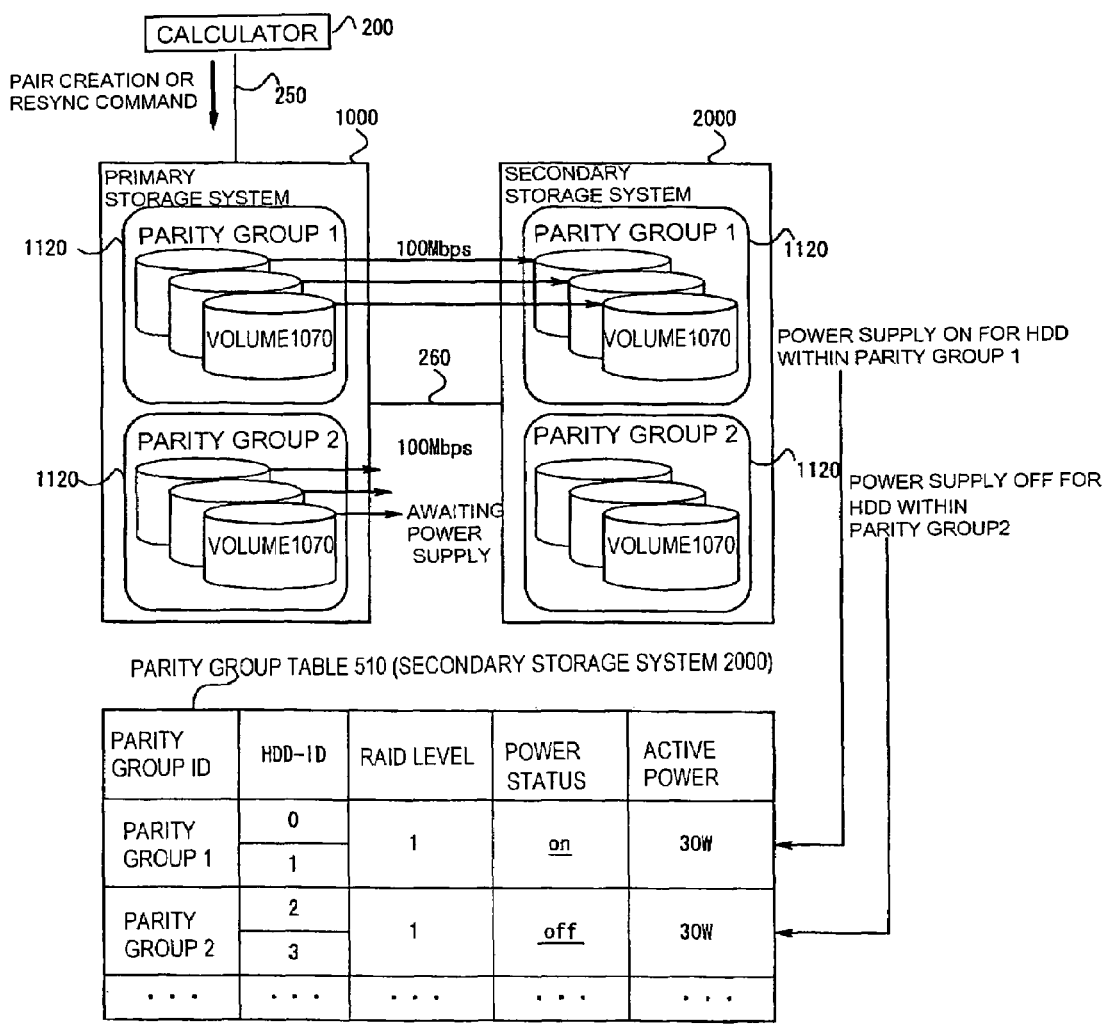
FIG. 11 is a schematic diagram of a second embodiment of the present invention.

FIG. 11 illustrates the system status in the event that the network bandwidth between the primary storage system 1000 and secondary storage system 2000 is 100 Mbps (bit per second), and the read performance of the parity group 1 of the primary storage system 1000 and the write performance to the parity group 1 of the secondary storage system 2000 are both 100 Mbps. Also, because the transfer bandwidth of the HDD 1060 comprising the parity group 1120 is 100 Mbps or more, the network 260 can be satisfied with the data copying within one parity group.

According to the features of the second embodiment of the present invention, with the secondary storage system 2000, first, only the parity group 1 is started, and differential copying is performed for the remote copy pair wherein the secondary volume belongs to the parity group 1. When the differential copying is completed, the parity group 1 is stopped, and the parity group 2 is started to which the secondary volume of the remote copy pair of the unfinished differential copying belongs. Also, differential copying is performed for the remote copy pair wherein the secondary volume belongs to the parity group 2.

Toward the bottom of FIG. 11, the content of the parity group table 510, when the differential copying of the remote copy wherein the secondary volume belongs to the parity group 1, is illustrated. The power supply of the parity group 1 is ON, but the power supply of the parity group 2 which is not performing differential copying is OFF.

Figure 12:
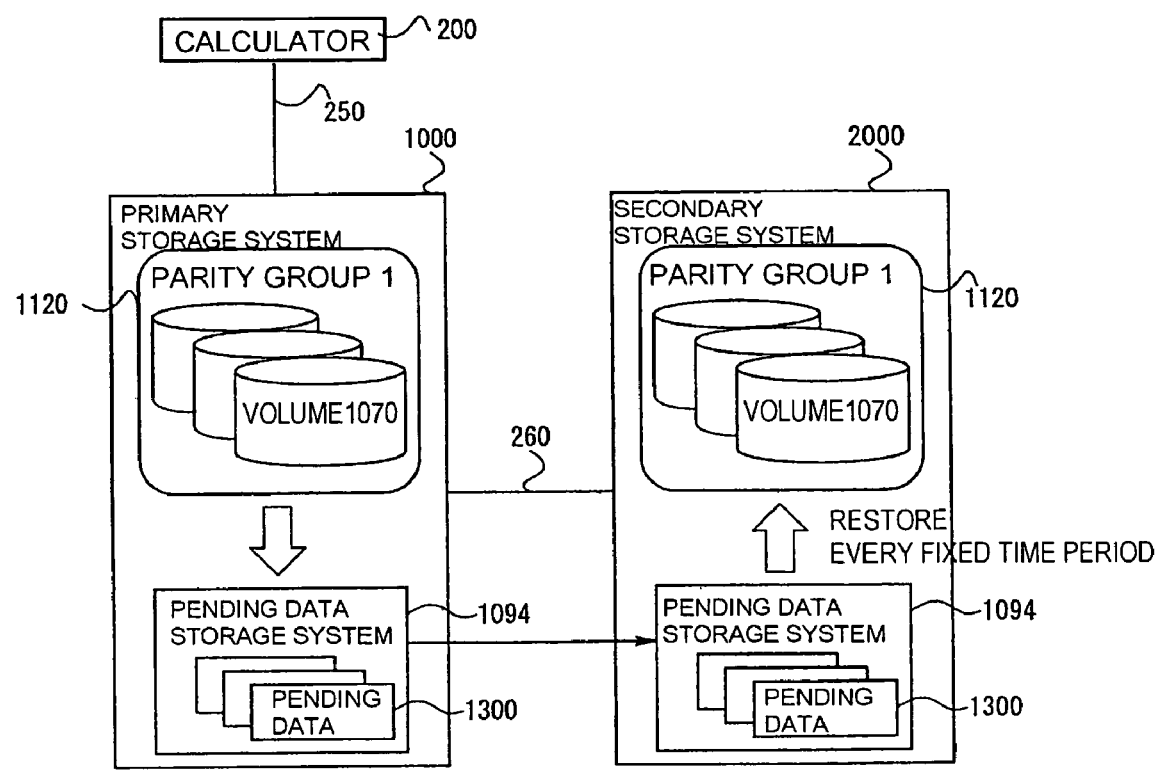
FIG. 12 is a schematic diagram of a third embodiment of the present invention.

Lastly, a third embodiment of the present invention (power control using a processing feature of asynchronous remote copying) will be described with reference to FIG. 12. With asynchronous remote copying, when the primary storage system 1000 receives a write request 300 from the calculator 200, an acknowledgment of write is forwarded back to the calculator 200, and afterwards, the write data 310 is transferred to the secondary storage system 2000. Therefore, the pending-data 1300 containing the write data 310 which the calculator 200 has issued to the primary storage system 1000 can accumulate in the pending-data storage unit 1094 of the primary storage system 1000 and secondary storage system 2000. With the present feature, such characteristics are used to perform power control.

In order to realize the present feature, first, remote copy processing is executed, and the pending-data 1300 containing the write data 310 is intentionally accumulated in the pending-data storage unit 1094 of the primary storage system 1000 and secondary storage system 2000. In other words, the writing of the write data 310 in the secondary volume waits a fixed amount of time or until a fixed amount of write data 310 accumulates. Also, by turning the power supply OFF to the parity group 1120 containing the secondary volume during the writing of the write data 310 being stopped, the reduction of power consumption is performed. The present feature is particularly an effective power consumption reduction method in the event that all or a portion of the parity group 1120 can be used as a partial region of the pending-data storage unit 1094.

Figure 13:
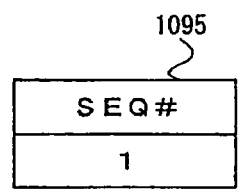
FIG. 13 is a diagram of an example of SEQ# information.

First, the SEQ# information 1095, which will be used in the descriptions hereafter, will be described in relation to the pending-data 1300. FIG. 13 shows an example of the SEQ# information 1095 which manages the numerical values (SEQ#) assigned when the pending-data creation unit 121, differential copy unit 129, and suspend unit 127 create the pending-data 1300. The SEQ# is used so that the order of write requests 300 which the primary storage system 1000 receives from the calculator 200 and the order of the write data 310 written into the secondary volume in the secondary storage system 2000 are identical.

Figure 14:
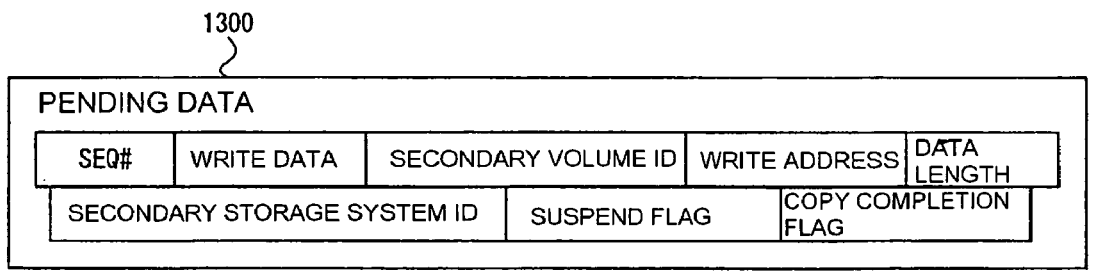
FIG. 14 is a diagram illustrating an example of pending-data.

FIG. 14 shows an example of the pending-data 1300 which is transferred from the primary storage system 1000 to the secondary storage system 2000 when asynchronous remote copying is performed. The pending-data 1300 has a SEQ#, write data, secondary volume ID, write address, data length, secondary storage system ID, suspend flag, and copy completion flag.

The pending-data 1300 is used for transferring the write data 310, written into the primary storage system 1000, from the calculator 200 to the secondary storage system.

The values stored in the pending-data 1300 will be shown below. The information stored in the write request 300, which the primary storage system 1000 receives from the calculator 200, is stored in the write data, write address, and data length. The secondary volume ID and the secondary storage system ID store the values that the pending-data creation unit 121 have acquired from the pair configuration table 1091.

Thus, the write data can also be written into the secondary storage system 2000. Also, the SEQ# stores the values acquired from the above-described SEQ# information 1095. The suspend flag and copy completion flag are for use with the suspend processing and resync processing, and will be described later.

The processing executed by the remote copy unit 1082 differs depending on the pair status of the remote copy pair, but with any status the write request 300 can be received from the calculator 200. Hereafter, descriptions will be made in the following order. (1) processing of the write request 300 in the event that the pair status of the remote copy pair is Duplex, (2) processing for suspending the remote copy pair and processing of the write request 300 in the event that the pair status is Suspend status, (3) processing for resynchronizing the remote copy pair and processing of the write request 300 in the event of Duplex- Pending status.

(1) Processing of the write request 300 in the event that the pair status of the remote copy pair is Duplex.

The write data of the write request 300 issued as to the primary volume of the remote copy pair, wherein the pair status is Duplex status, is written into the secondary volume of the secondary storage system 2000 asynchronously from the timing of receiving the write request 300. This is realized by the coordination of the write data reception unit 1081, pending-data creation unit 121, data transfer unit 122, purge unit 123 of the primary storage system 1000, and the pending-data reception unit 124 and restore unit 125 of the secondary storage system 2000.

Figure 15:
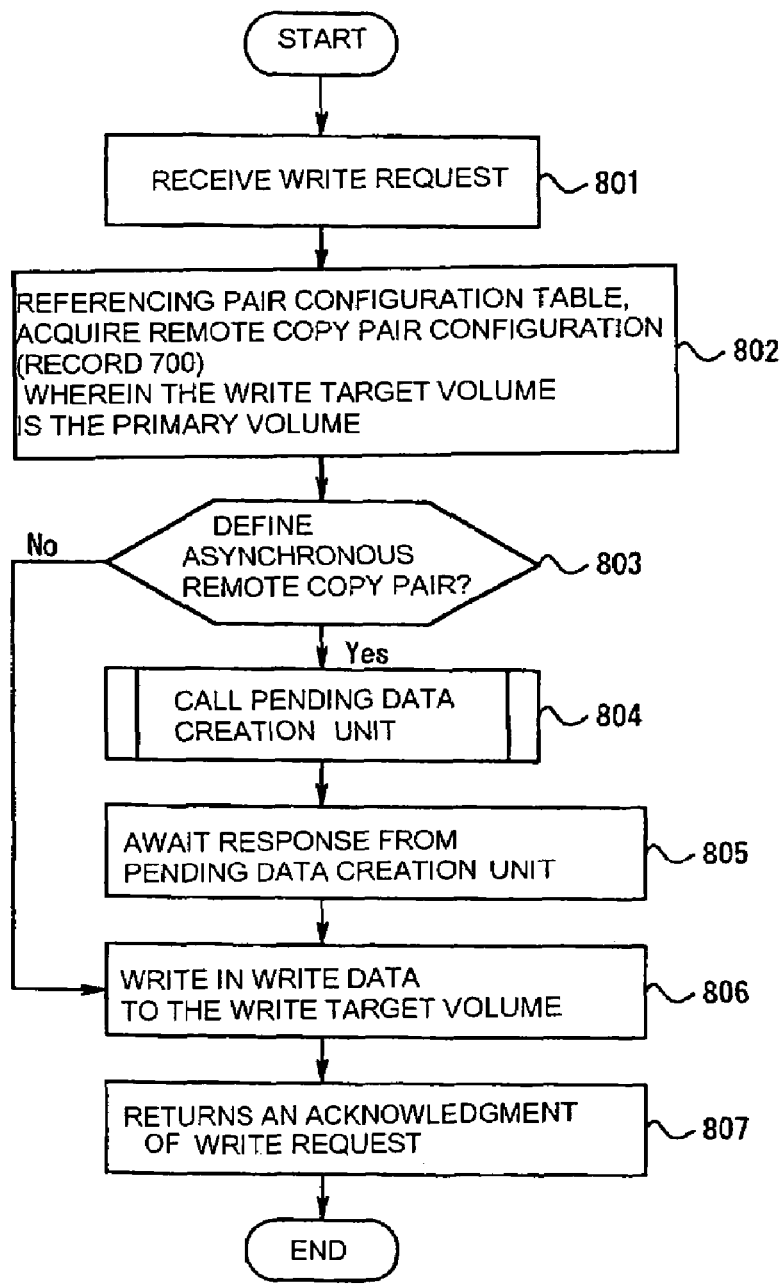
FIG. 15 is a diagram illustrating an example of the processing by the write data reception unit.

FIG. 15 illustrates an example of the processing of the write data reception unit 1081. However, before performing the present processing, the data of the primary volume and the data of the secondary volume are identical, by the differential copying to be described later. The write data reception unit 1081 receives the write request 300 from the calculator 200 (step 801). At this time, as shown in FIG. 4, the write data reception unit 1081 as the write request 300 receives the write data 310, volume ID 330 for writing, write address 320, and data length 340.

Next, the write data reception unit 1081 acquires the record 700 relating to the remote copy pair wherein the volume 1070 indicated by the volume ID 330 for writing is the primary volume (step 802). Specifically, the write data reception unit 1081 detects the pair configuration table 1091 using the volume ID 330 for writing as a key, and searches for the record 700 wherein the same ID as the volume ID 330 for writing is registered in the primary volume ID.

Subsequently, the write data reception unit 1081 checks to see if the asynchronous remote copying, wherein the volume 1070 indicated by the volume ID 330 for writing is the primary volume, has been defined (step 803). Specifically, the check is to determine whether the remote copy type of the record 700 acquired in step 802 is "asynchronous". In the event that in step 802 there is no record 700 relating to the remote copy pair wherein the volume 1070 indicated by the volume ID 330 for writing is the primary volume, the result of step 803 is "no".

In the event that the result of step 803 is "no", the write data reception unit 1081 skips steps 804 and 805, and executes step 806.

In the event that the result of step 803 is "yes", the write data reception unit 1081 calls the pending-data creation unit 121, using the content of the write request 300 and the record 700 checked in step 803 as parameters (step 804). Also, the write data reception unit 1081 awaits a response from the pending-data creation unit 121 (step 805).

When the write data reception unit 1081 receives a response from the pending-data creation unit 121, the write data 310 in the write request 300 is written into the volume for writing (step 806). Also, the writing into the volume 1070 can be substituted by writing into the cache 1040 within the storage system.

Lastly, the write data reception 1081 returns an acknowledgment of the write request to the calculator 200 which is the source of the write request (step 807). In other words, the calculator 200 recognizes that the writing of the write data 310 is completed at this point.

Figure 16:
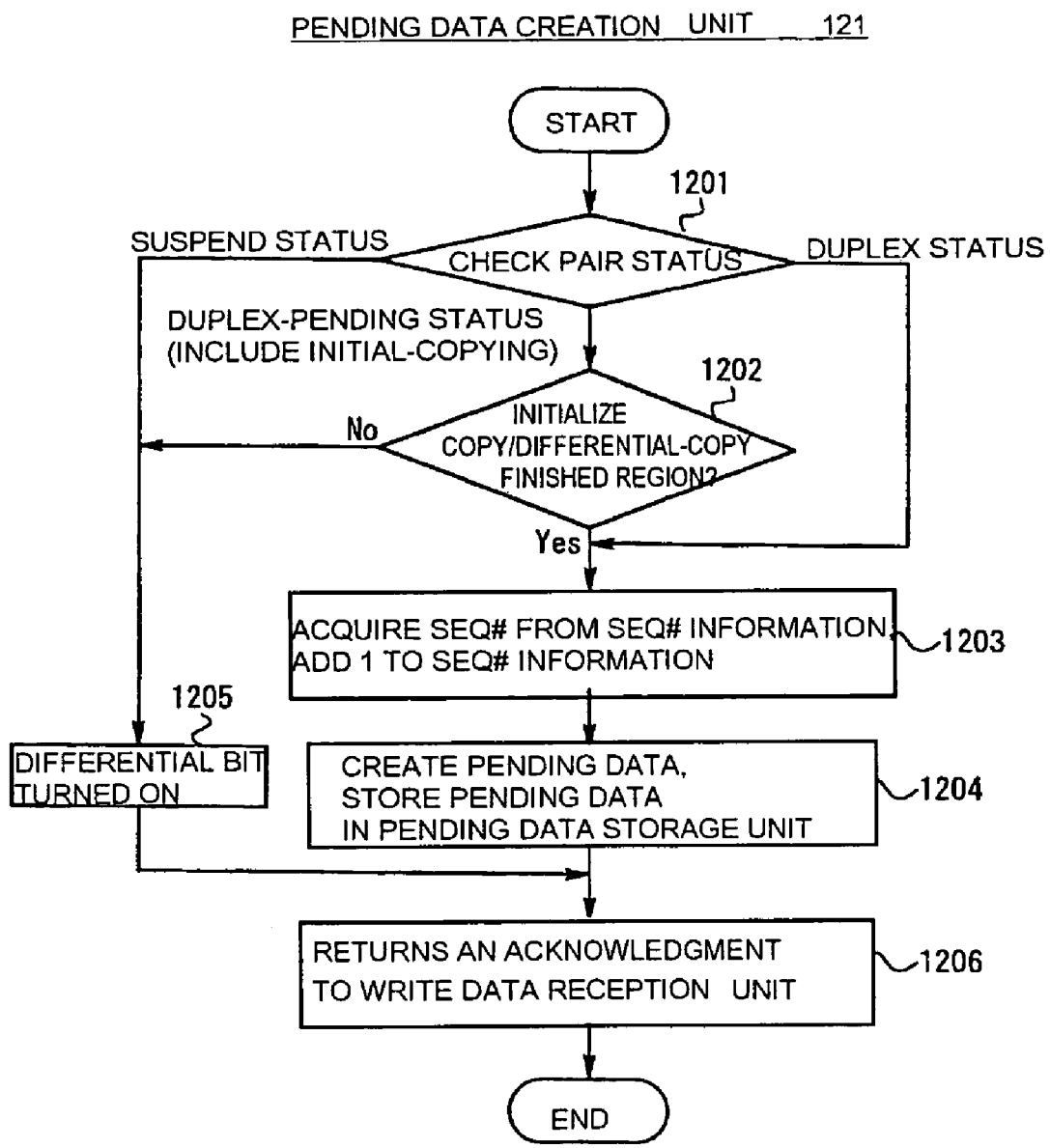
FIG. 16 is a diagram illustrating an example of the processing by the pending-data creation unit.

Next the process of the pending-data creation unit 121 will be described. FIG. 16 is a diagram illustrating an example of the processing of the pending-data creation unit 121. The pending-data creation unit 121 is started by the write data reception unit 1081 in step 804 of the write data reception unit 1081 shown in FIG. 15.

The pending-data creation unit 121 is a unit for creating the pending-data 1300 by assigning a SEQ# to the write data 310 during the write request 300 received by the primary storage system 1000 from the calculator 200.

First, the pending-data creation unit 121 checks the pair status of the record 700 provided as a parameter (step 1201).

Here, the remote copy pair is in Duplex status, and so the pending-data creation unit 121 skips step 1202 and executes the processing in step 1203 and thereafter.

The pending-data creation unit 121 acquires a current SEQ# from the SEQ# information 1095, and in order to prepare the SEQ# value to provide the next pending-data 1300, 1 is added to the SEQ# recorded in the SEQ# information 1095 (step 1203).

Next, the pending-data creation unit 121 creates the pending-data 1300 and stores this in the pending-data storage unit 1094 (step 1204).

Now, the values stored in the pending-data 1300 will be described. The SEQ# of the pending-data 1300 stores the SEQ# acquired in step 1203. The write data, write address, and data length store the write data 310, write address 320, and data length 340 of the write request 300. Also, the second volume ID of the record 700 provided from the write data reception unit 1081 is stored in the secondary volume ID, and the counterpart storage system ID in the record 700 provided from the write data reception unit 1081 is stored in the secondary storage system ID. Lastly, the suspend flag and the copy completion flag are both turned "off", and the pending-data creation unit 121 returns an acknowledgment to the write data reception unit 1081 (step 1206).

By the processing up to this point, the primary storage system 1000 can create the pending-data 1300 which is provided a sequential number in the order received as to the write request 300 received from the calculator 200, and can store this in the pending-data storage unit 1094. Thus, with the processing hereafter, the pending-data 1300 stored in the pending-data storage unit 1094 asynchronously from the timing of the write request 300 being received is transferred to the secondary storage system 2000, and by writing the write data into the secondary volume, asynchronous remote copying can be realized.

Figure 17:
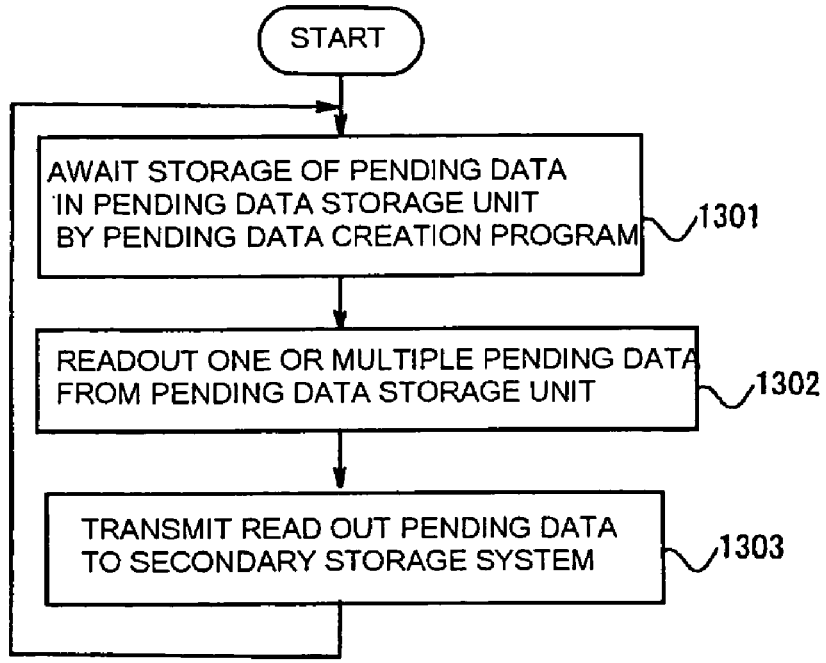
FIG. 17 is a diagram illustrating an example of the processing by the data transfer unit.

FIG. 17 illustrates an example of the processing of the data transfer unit 122 wherein the pending-data creation unit 121 transmits the pending-data 1300 stored in the pending-data storage unit 1094 of the primary storage system 1000 to the secondary storage system 2000. The data transfer unit 122 waits until the pending-data 1300 is stored in the pending-data storage unit 1094 of the primary storage system 1000 by the pending-data creation unit 121 (step 1301).

An arrangement may be made wherein the data transfer unit 122 does not execute the processing thereafter each time the pending-data 1300 is stored in the pending-data storage unit 1094, and instead the processing thereafter is executed at a timing different from the timing by which the pending-data 1300 is stored in the pending-data storage unit 1094, such as processing being executed at the point that a certain amount or more of pending-data 1300 is stored in the pending-data storage unit 1094 of the primary storage system 1000.

Next, the data transfer unit 122 reads one or multiple pending-data 1300 from the pending-data storage unit 1094 in the primary storage system 1000 (step 1302), and transmits the read out pending-data 1300 to the secondary storage system 2000 (step 1303). Also, the data transfer unit 122 returns to step 1301 and repeats the above processing.

Figure 18:
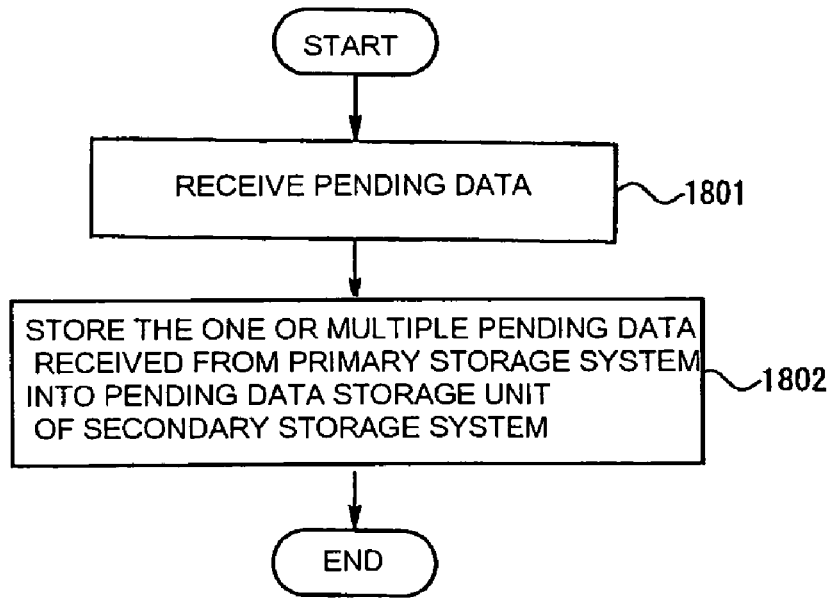
FIG. 18 is a diagram illustrating an example of the processing by the pending-data reception unit.

FIG. 18 illustrates an example of the processing of the pending-data reception unit 124 of the secondary storage system 2000 receiving the pending-data 1300 from the primary storage system 1000. The pending-data reception unit 124 receives the pending-data 1300 from the data transfer unit 122 of the primary storage system 1000 (step 1801). Then the pending-data reception unit 124 stores the received one or multiple pending data 1300 in the pending-data storage unit 1094 of the secondary storage system 2000 (step 1802).

Figure 19:
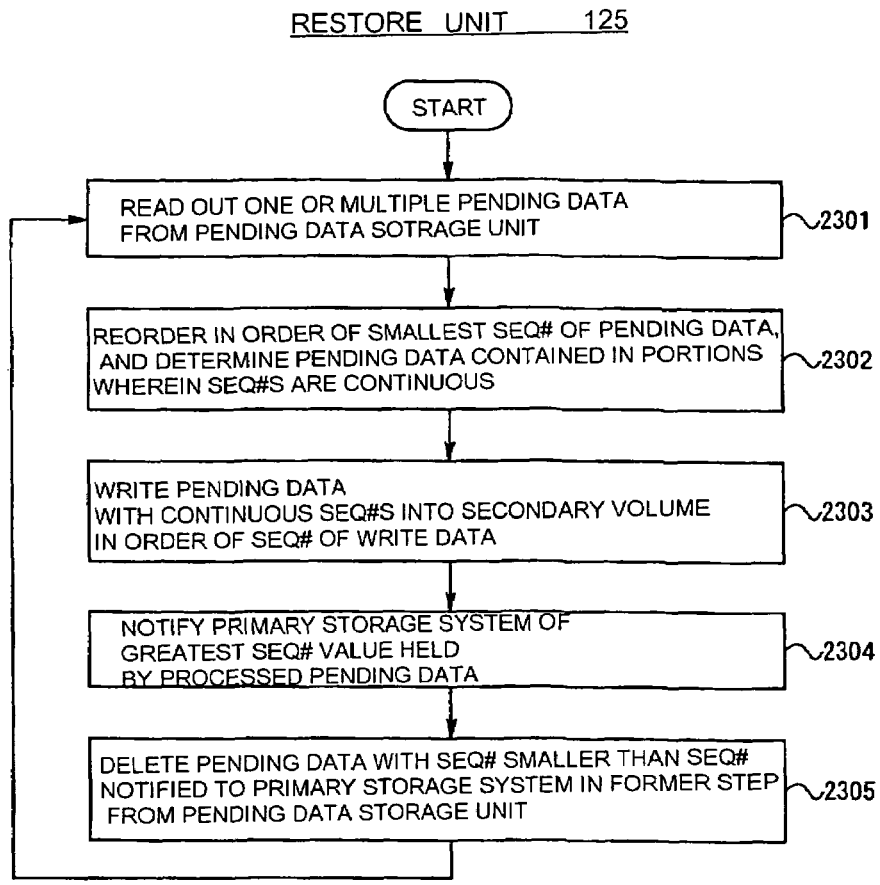
FIG. 19 is a diagram illustrating an example of the processing by the restore unit.

FIG. 19 is a diagram illustrating an example of the processing of the restore unit 125 which writes the write data 310 in the secondary volume, based on the content of the pending-data 1300 stored in the pending-data storage unit 1094 of the secondary storage system 2000. The restore unit maintains the newest SEQ# of the pending-data 1300 which has previously completed restoring, which is called a restored SEQ#, although this is not shown in the diagram.

The restore unit 125 reads one or multiple pending-data 1300 from the pending-data storage unit 1094 of the secondary storage system 2000 (step 2301). Next, the restore unit 125 sorts the read out pending-data 1300 using the SEQ# contained in the pending-data 1300, and further, of the continuous SEQ#s from the restored SEQ#, the newest value is found, and pending-data 1300 having a SEQ# lower than that value is decided (step 2302). Also, the pending-data 1300 decided in step 2302 is written into the secondary volume in the sorted order, and the restored SEQ#s are updated to completed SEQ#s (step 2303).

Thus, the write data can be written into the secondary volume while guaranteeing the order of the write request 300 which the primary storage system 1000 receives from the calculator 200. As a part of increasing speed, the writing processing of step 2303 can be performed concurrently. However, in this case, the writing order is assured by prohibiting the next writing until all of the writing up to the SEQ# decided in step 2302 is finished, and always finishing the writing up to the decided SEQ#.

The restore unit 125 notifies the restored SEQ# to the purge unit 123 of the primary storage system 1000 (step 2304). Lastly, the restore unit 125 deletes the pending-data 1300 having a SEQ# lower than the SEQ#, which has been notified to the purge unit 123 of the primary storage system 1000, from the pending-data storage unit 1094 of the secondary storage system 2000 (step 2305). The process then returns to step 2301. Also, the deletion of the pending-data 1300 does not necessarily delete the actual data; virtual deletion by operating the control information is sufficient.

The restore unit 125 as stated constantly repeats execution of the processing from step 2301 through step 2305, but in the event that pending-data 1300 is not stored in the pending-data storage unit 1094, the processing can be ended. Further, the restore unit 125 can also be started as necessary from other portions of the remote copy unit 1082.

Figure 20:
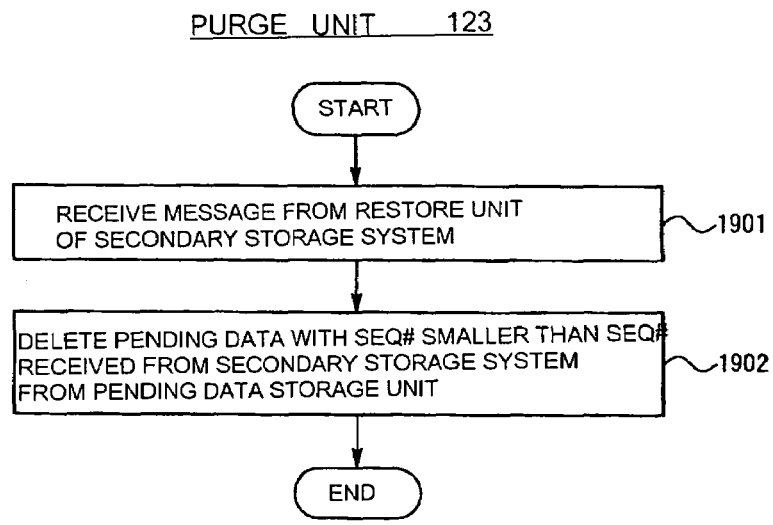
FIG. 20 is a diagram illustrating an example of the processing by the purge unit.

FIG. 20 is a diagram illustrating an example of the processing of the purge unit 123, which receives the SEQ# from the restore unit 125 of the secondary storage system 2000, and deletes the pending-data 1300 no longer necessary from the pending-data storage unit 1094 of the primary storage system 1000. The purge unit 123 receives a message from the restore unit 125 of the secondary storage system 2000 (step 1901). Next, the purge unit 123 deletes the pending-data 1300 having a SEQ# lower than the SEQ# which contained in the message received from the restore unit 125 of the secondary storage system 2000, from the pending-data storage unit 1094 of the primary storage system 1000 (step 1902). Also, the deletion of the pending-data 1300 does not necessarily delete the actual data; virtual deletion by operating the control information is sufficient.

Thus, the write data 310 which the calculator 200 writes into the primary volume of the primary storage system 1000 is transferred to the secondary storage system 2000 asynchronously from the write request 300, and by writing into the secondary volume in the SEQ# order, asynchronous remote copying which guarantees the writing order between the primary storage system 1000 and the secondary storage system 2000 can be realized.

(2) Processing for suspending the remote copy pair, and processing of the write request in the event that the pair status is Suspend status.

The Suspend command is a command to pause the data transfer from the primary volume to the secondary volume of the remote copy pair, and Suspend status refers to the status wherein the copying has stopped. The Suspend command is issued from the calculator 200 to the primary storage system 1000, specifying the primary volume ID, secondary volume ID, primary storage system ID, and secondary storage system ID.

Figure 21:
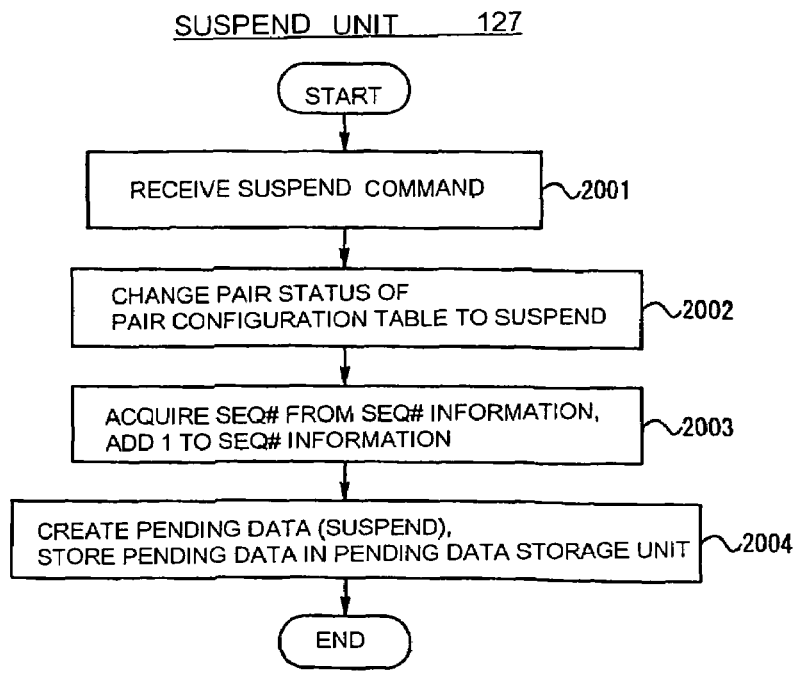
FIG. 21 is a diagram illustrating an example of the processing by the suspend unit of the primary storage unit.

FIG. 21 illustrates an example of the processing of the suspend unit 127 which receives the suspend command from the calculator 200 and executes suspend processing with the primary storage system 1000. The necessary processing with the primary storage system 1000 is as follows.

1) The pair status of the remote copy pair to be suspended is changed to Suspend status.

2) The pending-data 1300 accumulated in the pending-data storage unit 1094 of the primary storage system 1000 is all transferred, and the completion of the transfer is notified to the secondary storage system 2000.

3) The processing of the write request 300 as to the primary volume of the remote copy pair which has gone to Suspend status is changed. Specifically, the change is so as to start the recording of the write address 320.

The processing steps will be described below. The suspend unit 127, after receiving suspend command from the calculator 200 (step 2001), accesses the pair configuration table 1091, and changes the pair status of the remote copy pair to be suspended to Suspend status (step 2002).

At this point, the pending-data 1300 corresponding to the write request 300 as to the primary volume of the remote copy pair to be suspended from the calculator 200 is no longer created, and instead the write address 320 of the write request 300 begins to be recorded in the difference management table 1093. The details of the processing for recording the write address 320 in the difference management table 1093 will be described later.

Next, the suspend unit 127 acquires the current SEQ# from the SEQ# information 1095, and in order to prepare the SEQ# value to provide the next pending-data 1300, 1 is added to the SEQ# recorded in the SEQ# information 1095 (step 2003).

Lastly, the suspend unit 127 creates the pending-data 1300 and stores this in the pending-data storage unit 1094 (step 2004).

The pending-data 1300 created in step 2304 is a special pending-data 1300 for the purpose of notifying the secondary storage system 2000 that this pending-data 1300 is the last pending-data 1300 accumulated in the primary storage system 1000. This pending-data 1300 is expressed as "pending-data (suspend) 1300". In order to differentiate with other pending-data 1300, the value of the suspend flag in the pending-data 1300 is turned "on".

The values stored in the pending-data 1300 will be described. The SEQ# stores the SEQ# acquired in step 2003, and stores nothing in the write address, write data, or data length. The secondary volume ID and the secondary storage system ID store the secondary volume ID and the secondary storage system ID received by the suspended unit 127 from the calculator 200 as parameters,. The copy completion flag is turned "off", and the suspend flag is turned "on".

Next, the processing of the write request 300 from the calculator 200 as to the primary volume of the remote copy pair, of which the suspend unit 127 changes the pair status to Suspend status in step 2002, will be described. The write request 300 which the calculator 200 has issued to the primary volume is processed by the write data reception unit 1081 in a similar manner as with the Duplex status, and the pending-data creation unit 121 is called in step 804 in FIG. 15.

Now, proceeding to FIG. 16, with the processing of the pending-data creation 121, the pair status of the remote copy pair is checked in step 1201, and the result determines the status to be in Suspend status. Thus, the pending-data creation unit 121 searches the record 800 with the same value as the write address 320 contained in the write request 300 from the difference management table 1093, and the differential bit of this record 800 is changes to "on" (step 1205). Also, the pending-data creation unit 121 returns an acknowledgment to the write data reception unit 1081, and ends the process (step 1206). In other words, the pending-data 1300 is not created, and instead, the write address 320 of the write request 300 is recorded in the difference management table 1093.

When the primary volume and secondary volume of the remote copy pair are to be in a synchronous state again, the difference management table 1093 is used and copying can be done for only the regions wherein the data stored in the primary volume and secondary volume differ (differential copying).

Next the suspend processing with the secondary storage system 2000 will be described. The processing necessary to be performed with the secondary storage system 200 is as follows. (1) The pair status of the remote copy pair to be suspended is changed to Suspend status.

Figure 22:
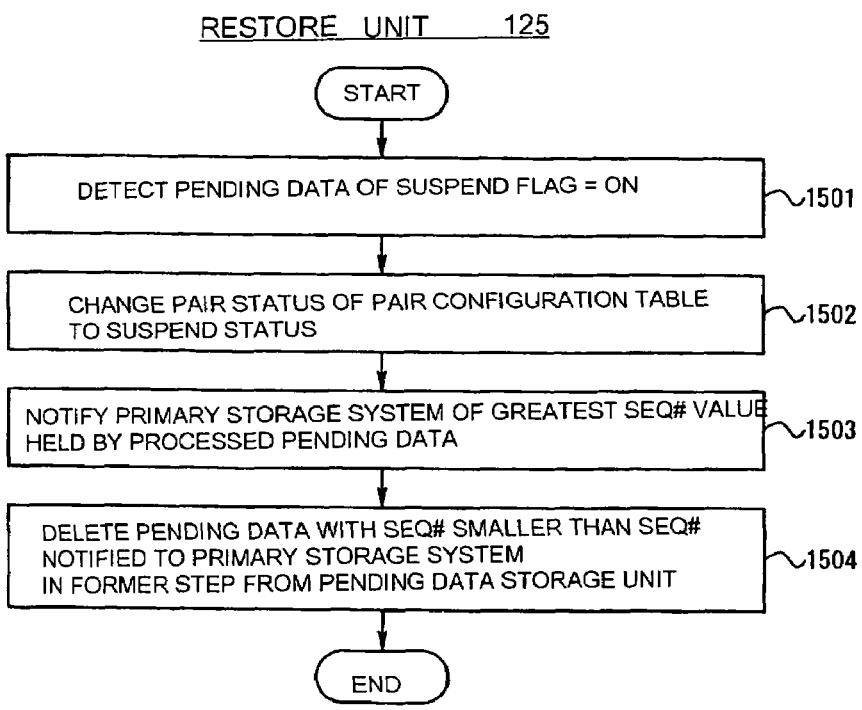
FIG. 22 is a diagram illustrating an example of the processing by the restore unit in the event of detecting suspending.

FIG. 22 illustrates an example of the processing of the restore unit 125 which detects the pending-data (suspend) 1300 and changes the pair status of the remote copy pair to Suspend status. The restore unit 125 performs processing to read the pending-data 1300 from the pending-data storage unit 1094 and write it into the secondary volume, and whether the pending-data (suspend) 1300 is made to be written is verified at the time the writing is performed.

If any pending-data (suspend) 1300 with the value of the suspend flag being "on" is found (step 1501), the pair configuration table 1091 is accessed, and the pair status of the remote copy pair to be suspended is changed to Suspend status (step 1502). Also, in order to delete the pending-data 1300 no longer necessary from the pending-data storage unit 1094 of the primary storage system 1000, the SEQ# of the pending-data (suspend) 1300 is notified to the purge unit 123 of the primary storage system 1000 (step 1503). Lastly, the pending-data 1300 having a SEQ# lower than the SEQ# belonging to the pending-data (suspend) 1300 is deleted also from the pending-data storage unit 1094 of the secondary storage system 2000 (step 1504).

Thus, suspending the remote copy pair is realized by the cooperation of the suspend unit 127 of the primary storage system 1000 and the restore unit 125 of the secondary storage system 2000. Also, with the above description, the pending-data (suspend) 1300 has the meaning both for notification information for the purpose of transitioning the pair status, and for information showing that the transfer of the pending-data 1300 prior to the suspend has been completed. However, the notification information of the pair status transitioning can be notified to the secondary storage system 2000 with another method.

(3) Processing for resynchronizing the remote copy pair and processing of the write request 300 in the event of Duplex-Pending status.

Resync command is a command to cause the data stored in the primary volume and secondary volume of the remote copy pair in Suspend status to be in a synchronous state again. This resync command is issued from the calculator 200 to the primary storage system 1000, specifying the primary volume ID, secondary volume ID, primary storage system ID, and secondary storage system ID.

After receiving the resync command, the primary storage system 1000 and the secondary storage system 2000 transfer the data stored in the address which is recorded in the difference management table 1093, in an order unrelated to the write order from the calculator, from the primary volume to the secondary volume, and therefore the write order of the secondary volume is not maintained. Therefore, the information of the present status during execution of differential copying is provided to the calculator 200 as Duplex-Pending status.

Figure 23:
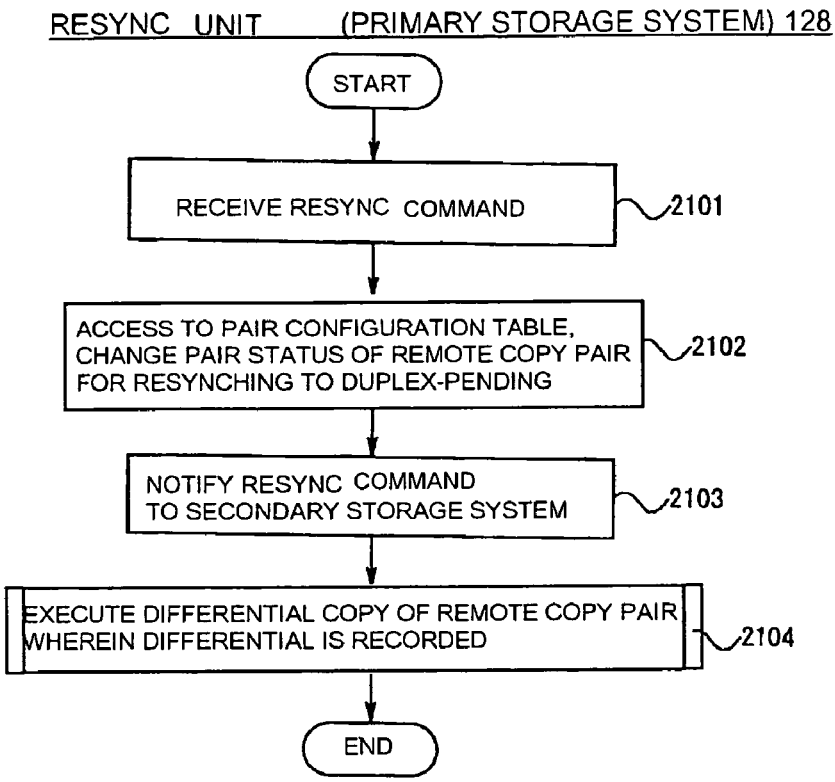
FIG. 23 is diagram illustrating an example of the processing by the resync unit of the primary storage system.

FIG. 23 illustrates an example of the processing of the resync unit 128 which receives resync command from the calculator 200, and executes the resync processing with the primary storage system 1000. The processing required to perform with the primary storage system 1000 are as follows.

(1) When the resync command are received, the pair status of the remote copy pair to be resynchronized is changed to Duplex-Pending, and shows the user that the resync processing has started correctly.

(2) Based on the information stored in the difference management table 1093, copying of data can be done for only the regions wherein the data stored in the primary volume and secondary volume differ.

(3) The processing for the write request as to the primary volume of the remote copy pair which is in Duplex-Pending status is changed. Specifically, different processing is executed in the event that the write address 320 of the write request 300 is a region having completed differential copying, and in the event of a region not having completed differential copying. Details will be described later.

(4) When the differential copying is completed, differential copy completion is notified to the secondary storage system 2000, and the pair status of the remote copy pair to be resynchronized is changed to Duplex status.

The processing steps are described below. When the resync unit 128 receives resync command from the calculator 200 (step 2101), the pair configuration table 1091 is accessed, and the pair status of the remote copy pair to be resynchronized is changed to Duplex-Pending status (step 2102).

Next, resync command is notified to the secondary storage system 2000 for the purpose of changing the pair status of the pair configuration table 1091 of the secondary storage system 2000 (step 2103). Lastly, the resync unit 128 calls the differential copy unit 129 which executes differential copying, and ends the process (step 2104).

Figure 26:
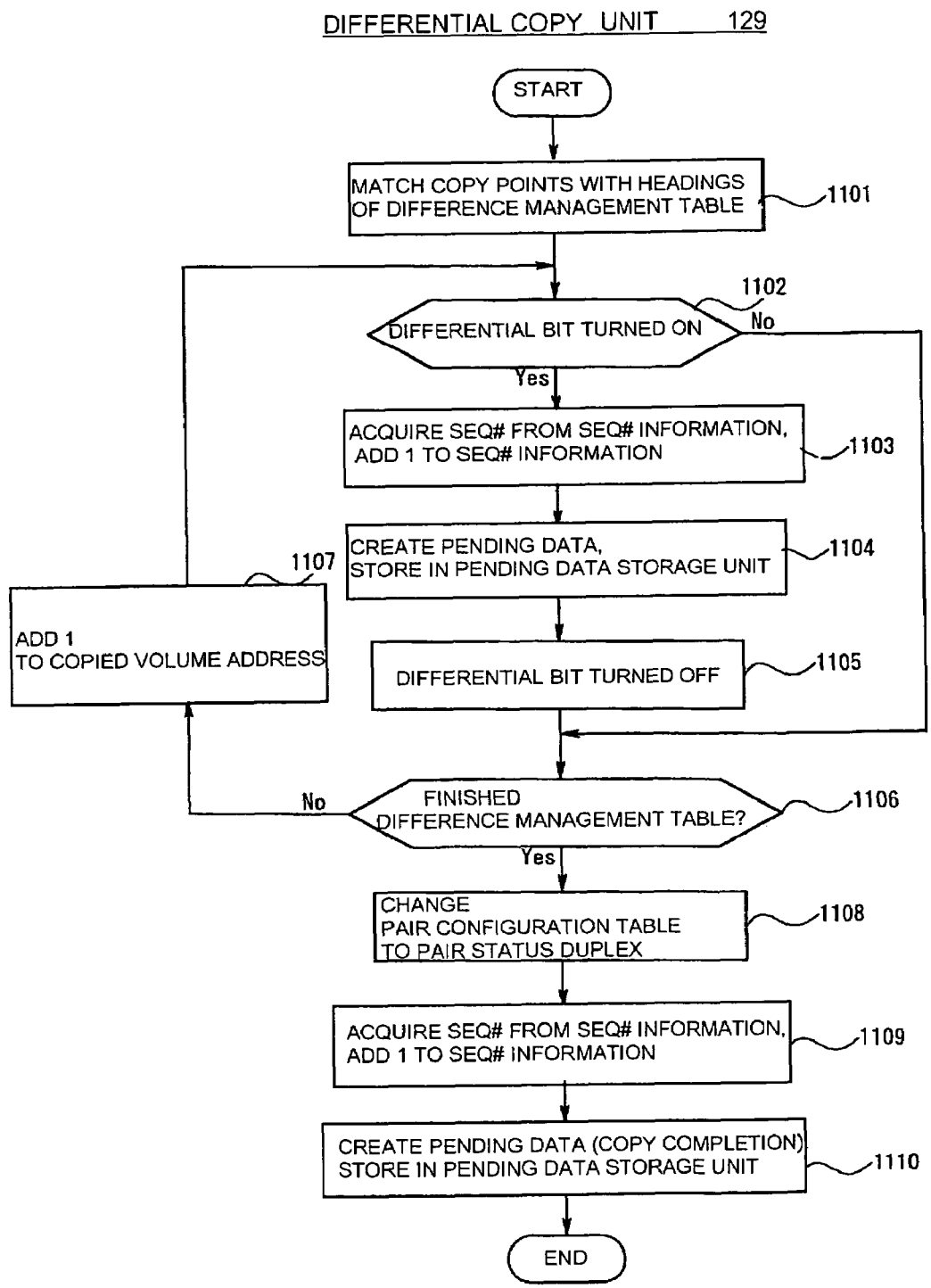
FIG. 26 is a diagram illustrating an example of the processing by the differential-copy unit.

Next, the processing of the differential copy unit 129 called from step 2104 of the resync unit 128 of the primary storage system 1000 will be described. FIG. 26 illustrates an example of the processing of the differential copy unit 129 which performs differential copying using the differential management table 1093.

First, the differential copy unit 129 sets the value of the copied volume address to be "0" to show the start (the position of the record 800 having a volume address "0") of the differential management table 1093 (step 1101). Next, the differential copy unit 129 checks whether the differential bit of the record 800 showing a copied volume address is "on" or "off" (step 1102).

In the event the value of the differential bit is "on", the data stored in the primary volume and the secondary volume differs for the regions shown by the volume address of the record 800. The differential copy unit 129 acquires the current SEQ# from the SEQ# information 1095, and adds 1 to the SEQ# stored in the SEQ# information 1095 (Step 1103).

Also, the differential copy unit 129 creates the pending-data 1300 with the SEQ# acquired in the prior step and data stored in the region shown by the volume address of the record 800, and stores this pending-data in the pending-data storage unit (step 1104).

Next, the differential copy unit 129 changes the value of the differential bit of the record 800 showing the currently copied volume address from "on" to "off" (step 1105).

In the event the value of the differential bit is "off", the data stored in the primary volume and secondary volume regarding the regions shown by the volume address of the record 800 are already the same, and therefore the steps 1103, 1104, and 1105 are skipped, and step 1106 and thereafter are executed.

The differential copy unit 129 checks whether the address shown in the copied volume address is at the end of the difference management table 1093 (step 1106). In the event it is not at the end, the differential copy unit 129 adds 1 to the copied volume address, and the process returns to step 1102 (step 1107). Based on the process of steps 1101 through 1107, the records 800 of the difference management table 1093 are all scanned, and pending-data 1300 having data stored in the address wherein the differential bit is "on" can be created. Thus, by writing the write data of this pending-data 1300 into the secondary volume, the data stored in the primary volume and secondary volume can be in a synchronous state.

Continuing, the processing for notifying completion of the differential copy after step 1108 and the processing for updating the pair configuration table 1091 of the primary storage system 1000 will be described. The differential copy unit 129 accesses the pair configuration table 1091 of the primary storage system 1000, and changes the pair status of the remote copy pair performing differential copying to Duplex status (step 1108). Next, similar to step 1103, the differential copy unit 129 acquires the current SEQ# from the SEQ# information 1095, and adds 1 to the SEQ# stored in the SEQ# information 1095, so as to prepare the SEQ# value to be provided to the next pending-data 1300 (step 1109).

Then the differential copy unit 129 creates the pending-data 1300, and stores the created pending-data 1300 in the pending-data storage unit 1094 of the primary storage system 1000 (step 1110). This pending-data 1300 is a special pending-data 1300 for the purpose of notifying the secondary storage system 2000 of differential copy completion. This pending-data 1300 is expressed as "pending-data (copy completed)". In order to differentiate with other pending-data 1300, the value of the copy completion flag in the pending-data 1300 is turned "on".

The values stored in the pending-data 1300 will be described. The SEQ# stores the value acquired in step 1109, and stores nothing in the write address, write data, or data length. The suspend flag is turned "off". The copy completion flag is turned "on".

Next, the processing of the write request 300 of the calculator 200 as to the primary volume of the remote copy pair during Duplex-Pending status will be described. As shown in FIG. 15, the write request 300 which the calculator 200 has issued to the primary volume is processed by the write data reception unit 1081 in a similar manner as with the Duplex status, and the pending-data creation unit 121 is called in step 804.

Proceeding to FIG. 16, with the processing of the pending-data creation unit 121, the pair status of the remote copy pair is checked in step 1201, whereby the status is determined to be in Duplex-Pending status.

Thus, the pending-data creation unit 121 determines whether or not the regions shown by the write address 320 of the write request 300 is already completed (step 1202). The determination in step 1202 is made by the pending-data creation unit 121 comparing the copied volume address of the difference management table 1093 and the write address 320 of the write request 300.

In the event that the region shown by the write address 320 of the write request 300 is a region for which differential copying is not completed, the pending-data creation unit 121 executes the processing in step 1205 and step 1206 in a similar manner as with the Suspend status. In the event that the region has not yet completed differential copying, if the difference is recorded in the difference management table 1093, afterwards, the differential copy unit 129 copies from the primary volume to the secondary volume.

On the other hand, in the event that the region shown by the write address 320 of the write request 300 is the region having completed differential copying, the pending-data creation unit 121 executes the processing of step 1203 and thereafter. In other words, the pending-data creation unit 121 creates the pending-data 1300. Afterwards, the pending-data is transferred to the secondary storage system by the data transfer unit 122.

Next, the processing with the secondary storage system 2000 will be described. The processing necessary to be performed with the secondary storage system 2000 is as follows.

(1) A notification of the resynchronizing command is received from the primary storage system 1000, and the pair status of the remote copy pair for resynching is changed to Duplex-Pending.

(2) The write data of the pending-data 1300 received from the primary storage system 1000 is written into the secondary volume.

(3) Differential copy completion is detected, and the pair status of the remote copy pair for resynchronizing is changed to Duplex.

Figure 24:
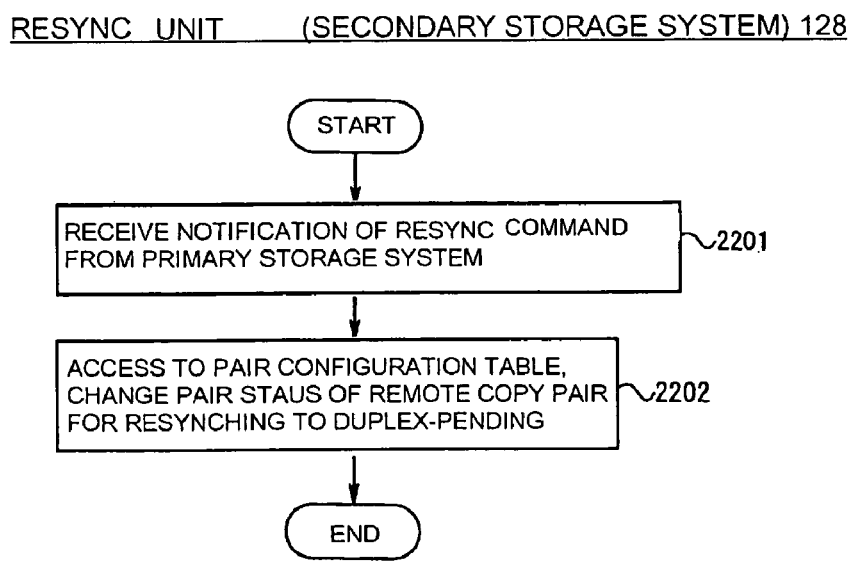
FIG. 24 is diagram illustrating an example of the processing by the resync unit of the secondary storage system.

FIG. 24 illustrates an example of the processing of the resync unit 128 of the secondary storage system 2000 which receives the notification with resync command of the remote copy pair from step 2103 of the resync unit 128 of the primary storage system 1000. The resync unit 128 of the secondary storage system 2000 receives notification of the resync command from the primary storage system 1000 (step 2201). Then the pair configuration table 1091 in the secondary storage system 2000 is accessed, and the pair status of the remote copy pair for resynchronizing is changed to Duplex-Pending (step 2202).

Thus, the pair status of the remote copy pair with the secondary storage system 2000 is also changed to Duplex-Pending and can show the user that the differential copying is correctly started.

Figure 25:
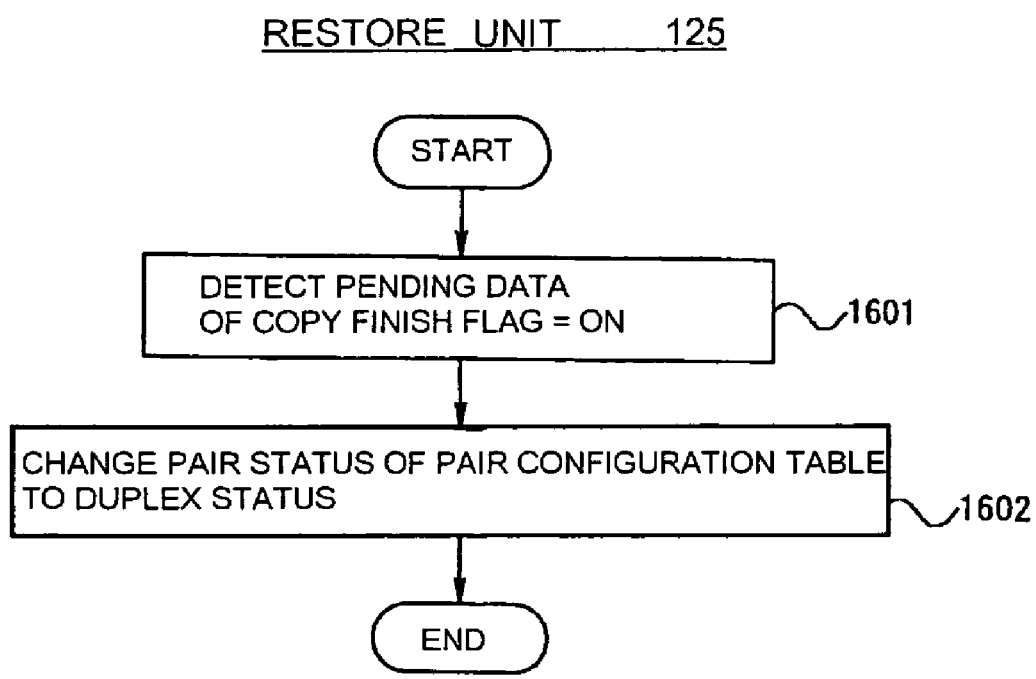
FIG. 25 is a diagram illustrating an example of the processing by the restore unit in the event of detecting differential copy completion.

FIG. 25 illustrates an example of the processing of the restore unit 125 which detects pending-data (copy completion) 1300 and changes the pair status of the remote copy pair to Duplex status. The restore unit 125 finds the pending-data 1300 wherein the value of the copy completion flag is "on" (step 1601), and the pair configuration table 1091 is accessed, and the pair status of the remote copy pair to be resynchronized is changed to Duplex status (step 1602). Thus, resynchronizing of remote copy pair is realized by the cooperation of the resync unit 127 and the differential copy unit 129 of the primary system 1000, and the resync unit 127 of the secondary system 2000.

Figure 27:
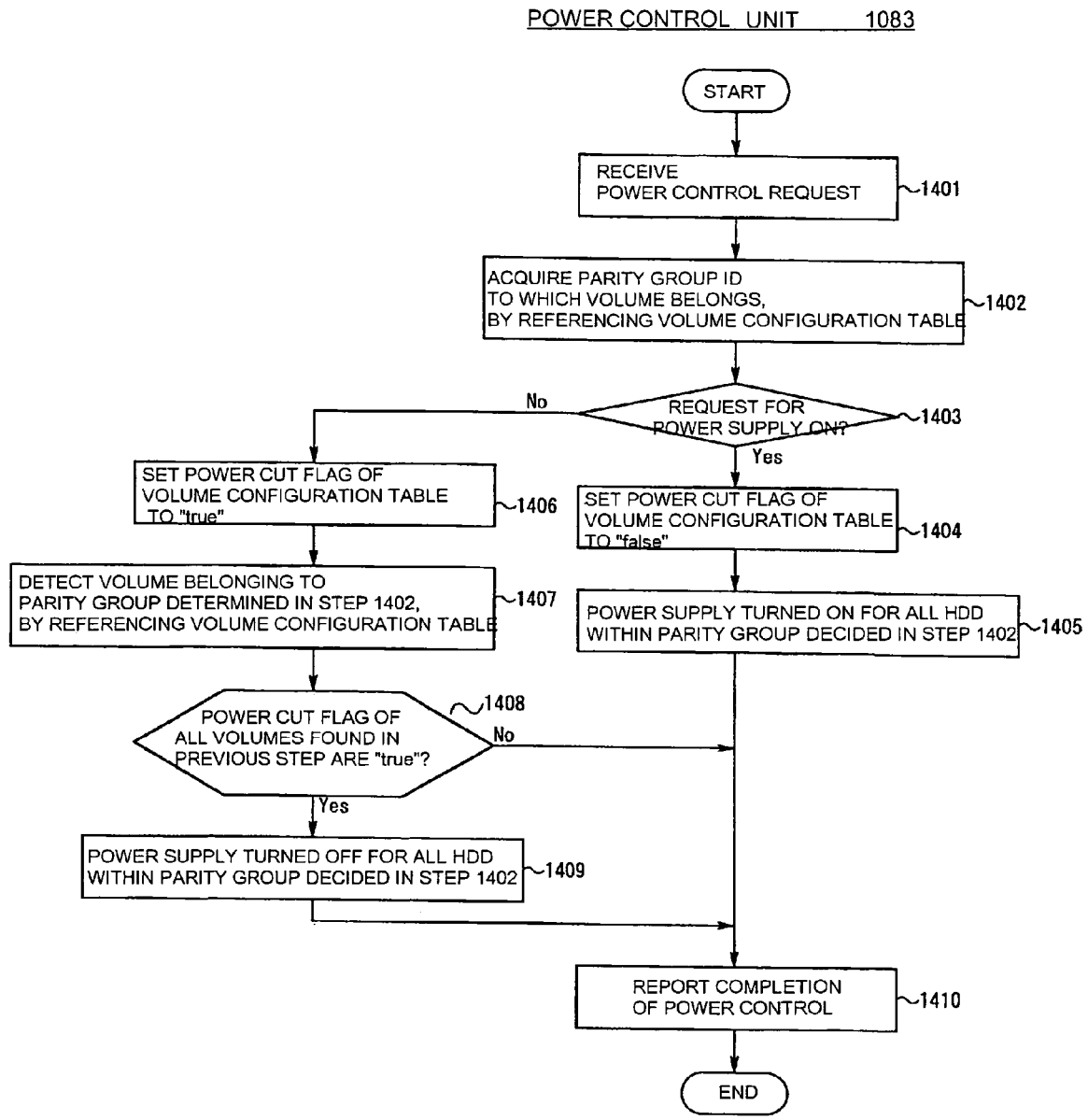
FIG. 27 is a diagram illustrating an example of the processing by the power control unit.

Lastly, the content of the processing of the power control unit 1083 will be described, and afterwards, the processing content of the embodiment of the present invention will be described. FIG. 27 describes an example of the processing of the power control unit 1083. This receives the volume ID as a parameter and the request content (power supply ON or power supply OFF), and starts and stops the parity group 1120 to which the volume 1070 belongs, according to the request content.

The power control unit 1083 receives a power control request (step 1401). Next, the power control unit 1083 acquires the parity group ID to which the volume belongs which is shown by the volume ID received as a parameter, by referencing the volume configuration table 500. Then the power control unit 1083 checks the request content provided as parameters, and thus determines whether the request is for power supply ON or whether the request is for power supply OFF (step 1403).

In the event that the request is for power supply ON, the power control unit 1083 accesses the volume configuration table 500 and finds a record 501 having a volume ID which is provided as a parameter. Then the power cut flag of this record 501 is changed to "false" (step 1404). Thus, the volume 1070 declares that the parity group 1120 decided in step 1402 is in use.

Next, the power control unit 1083 accesses the parity group table 510, and changes the power status of the parity group 1120 decided in step 1402 to "ON", and instructs the power control module 1140 to turn the power supply ON for all HDDs 1060 within this parity group 1120 (step 1405). In the event that the power status is already ON, step 1405 is skipped. Lastly, power control completion is declared to the power control request source (step 1410).

Next, the event of power supply OFF will be described. First, the power control unit 1083 accesses the volume configuration table 500 and finds a record 501 having a volume ID which is provided as a parameter. Then the power cut flag of this record 501 is changed to "true" (step 1406). Thus, the volume 1070 declares that the parity group 1120 to which the volume 1070 belongs, decided in step 1402, can be stopped.

Next, the power control unit 1083 accesses the volume configuration table 500 again and find all of the volumes belonging to the parity group 1120 decided in step 1402 (step 1407). The power control unit 1083 references the power cut flags of all of the volumes found in the prior step 1407, and checks whether or not the power cut flags for all the volumes are "true" (step 1408).

In the event that the power cut flags for all of the volumes are "true", this indicates that all of the volumes contained in the parity group 1120 can stop the power supply, and therefore the power control unit 1083 accesses the parity group table 510, and changes the power status of the parity group 1120 decided in step 1402 to "OFF", and instructs the power control module 1140 to turn the power supply OFF for the HDD 1060 in this parity group 1120 (step 1409).

Next, in the event there is one or more "false" among the power cut flags, this indicates that there is a volume 1070 which is using the HDD 1060 within the parity group 1120, and therefore, step 1409 is skipped, and the power control unit 1083 declares power control completion to the power control request source (step 1410).

The processing for coordinating the remote copying and power control which have been described up to this point will be described. The power control in coordination with the suspend command of the remote copying will be described. With the present coordinating control, the secondary storage system 2000 turns the power supply OFF if the HDD 1060 comprising the secondary volume of the remote copy pair is feasible, matching the suspend command of the remote copy pair issued from the calculator 200.

Figure 28:
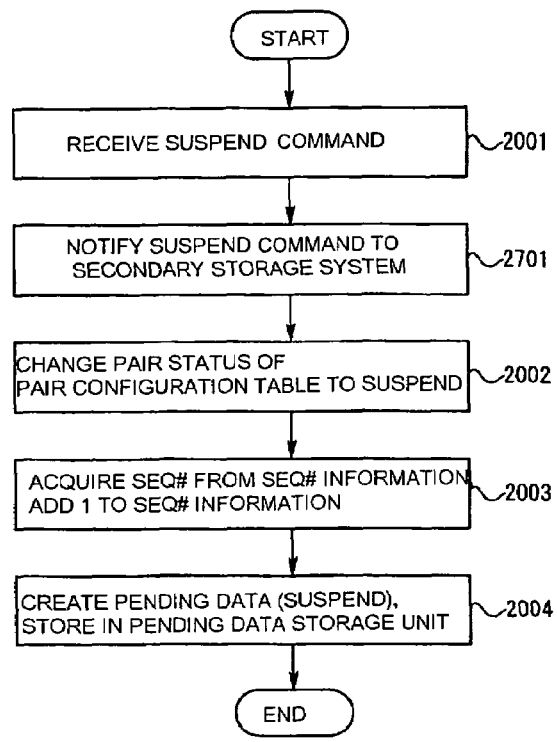
FIG. 28 is a diagram illustrating an example of the processing by the suspend unit of the primary storage system which considers power control.

This is realized by the coordination of the suspend unit 127 of the primary storage system 1000 and the suspend unit 127 of the secondary storage system 2000. First, FIG. 28 shows an example of the processing of the suspend unit 127 of the primary storage system 1000. The difference point with the suspend unit 127 not cooperating with the power control described in FIG. 21, is the that immediately following step 2001, a step 2701 is added for notifying the suspend unit 127 of the secondary storage system 2000 that the suspend command have been received.

Figure 29:
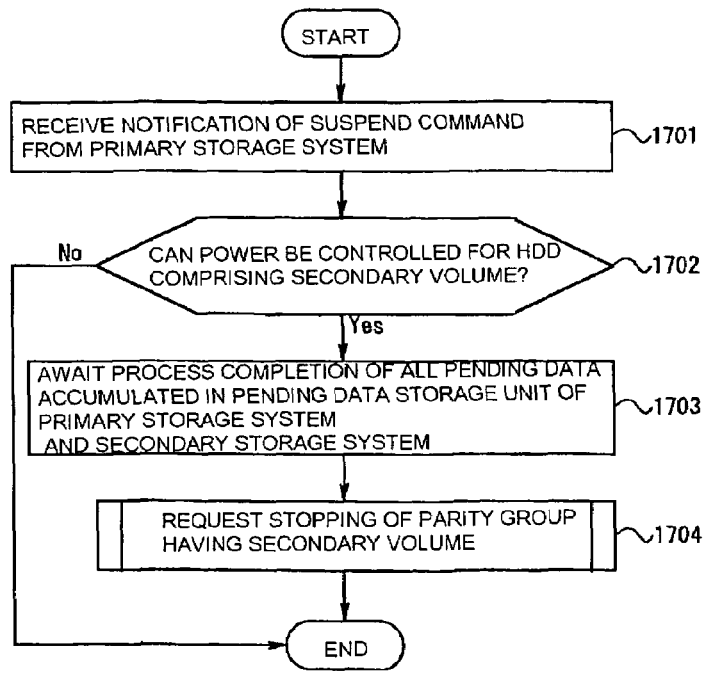
FIG. 29 is a diagram illustrating an example of the processing by the suspend unit of the secondary storage system which considers power control.

Next, FIG. 29 shows an example of the processing in the suspend unit 127 of the secondary storage system 2000. The details of each step will be described below. The suspend unit 127 receives notification of suspend command from the suspend unit 127 of the primary storage system (step 1701).

Next, the suspend unit 127 checks as to whether or not power control is feasible for the HDD 1060 which comprises the secondary volume of the remote copy pair to be suspended (step 1702). This check is performed by searching for a record

501 relating to this secondary volume from the volume configuration table 500, and referencing a MAID flag of this record 501. In the event that the MAID flag value is "true", the power control for the HDD 1060 which comprises the volume is determined to be feasible.

In the event that power control is not feasible for the HDD 1060 which comprises the secondary volume of the remote copy pair to be suspended, the processing is ended, and the process is handed over to the restore unit 125 shown in FIG. 19.

In the event that power control is feasible for the HDD 1060 which comprises the secondary volume of the remote copy pair to be suspended, the suspend unit 127 waits until the write data of all of the pending-data 1300 accumulated in the pending-data storage unit 1094 of the secondary storage system 2000 is written into the secondary volume (step 1703). When the restore unit 125.of the secondary storage system 2000 changes the pair status of the remote copy pair to be suspended to Suspend, it is determined that all of the pending-data 1300 has been written into the secondary volume.

Lastly, the suspend unit 127 requests the power control unit 1083 to stop the parity group 1120, to which the secondary volume of the remote copy pair to be suspended belongs (step 1704).

Thus, when the primary storage system 1000 receives suspend command for the remote copy pair from the calculator 200, immediately following writing all of the write data 310 of the write request 300, which the primary storage system 1000 receives from the calculator 200 prior to receiving the suspend request, into the secondary volume of the secondary storage system 2000, if feasible, the power supply is controlled to be OFF for the HDD 1060 in the parity group 1120 to which the secondary volume belongs. Thus, greater longevity of the HDD 1060 and lower power consumption can be expected.

The power control considering network bandwidth between the storage systems will be described. With the present coordinating control, resync (or pair creation) command for the remote copy pair is received from the calculator 200, and when performing differential copying, the number of parity groups started with the secondary storage system 2000 is controlled to a fixed number. This is realized by the coordination of the resync unit 128 of the primary storage system 1000 and the resync unit 128 of the secondary storage system 2000.

When the resync unit 128 of the primary storage system 1000 receives resync command for the remote copy pair from the calculator 200, the following processing is executed. The items listed below are only showing items which differ from processing which the resync unit 128 of the conventional art executes.

(1) When notifying the secondary storage system 2000 of the receipt of the resync command, a remote copy pair of which the difference is not recorded in the difference management table 1093, that is to say, a remote copy pair of which the primary volume and secondary volume are already in a synchronous state, is searched, and the information of this remote copy pair is also notified to the secondary storage system.

(2) When notification is made from the secondary storage system that differential copy starting is feasible, only the data in regions wherein the data stored between the primary volume and secondary volume differs is copied based on the information recorded in the difference management table 1093.

Figure 30:
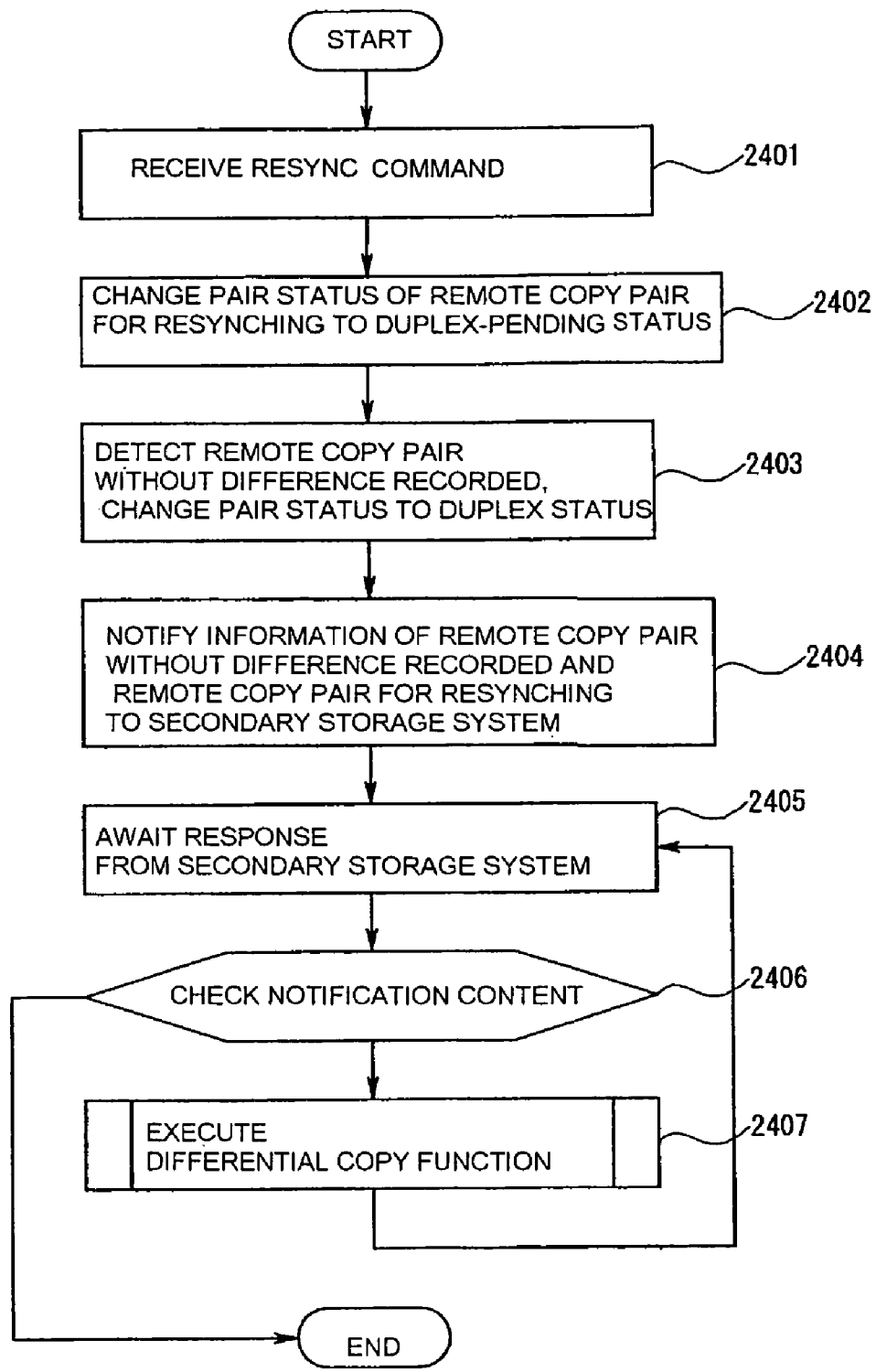
FIG. 30 is a diagram illustrating an example of the processing by the resync unit of the primary storage system which considers power control.

FIG. 30 shows an example of the processing of the resync unit 128 of the primary storage system 1000. The details for each step will be described below. The resync unit 128 receives resync command for one or more remote copy pairs from the calculator 200 (step 2401). At this time, the information for remote copy pair to be resynchronized is received as a parameter. The remote control pair information refers the primary volume ID, secondary volume ID, primary storage system ID, and secondary storage system ID.

Next, the resync unit 128 accesses the pair configuration table 1091 for the primary storage system 1000, and changes the pair status for the remote copy pair to be resynchronized to Duplex-Pending status (step 2402).

Then the resync unit 128 finds a remote copy pair of which the difference is not recorded in the difference management table 1093, of the remote copy pairs to be resynchronized. This remote copy pair accesses the pair configuration table 1091 because the data already stored in the primary volume and secondary volume is in a synchronous state, and changes the pair status to Duplex status (step 2403).

Subsequently, the resync unit 128 notifies the secondary storage system 2000 that resync command have been received. At this time, the information of the remote copy pair wherein the difference found in the prior step 2403 is not stored, and the information of the remote copy pair for resynchronizing which is received from the calculator 200, are provided as parameters (step 2404).

The processing hereafter of the resync unit 128 receives a response from the secondary storage system 2000 (step 2405), and checks the response content (step 2406). If the response content received from the secondary storage system 2000 is "differential copy completion notification", the process is ended. If the response content received from the secondary storage system 2000 is "differential copy startup feasible notification", the differential copy of the remote copy pairs notified with "differential copy startup feasible notification" are requested to the differential copy unit 129 (step 2407). Then the process returns to step 2405, and steps 2405 through 2407 are repeated until "differential copy completion notification" is received.

Next, the resync unit 128 of the secondary storage system 2000 will be described. When the resync unit 128 of the secondary storage system 2000 receives notification of the resync command of the remote copy pair from the resync unit 128 of the secondary storage system 1000, the following process is executed. The items listed below are only showing items which differ from processing which the resync unit 128 with conventional art executes.

(1) The pair status of the remote copy pair of which the difference is not recorded in the difference management table 1093 of the primary storage system 1000 is changed to Duplex status.

(2) A secondary volume for which power control of the HDD 1060 comprising the secondary volume is not feasible is searched from the remote copy pairs to be resynchronized, and the "differential-copy startup feasible notification" is notified to the primary storage system 1000.

(3) A fixed number of parity groups 1120 capable of starting with an electrical energy objective 1097 are started, and the "differential copy startup feasible notification" for the remote copy pairs of which the secondary volume belongs to the parity group 1120 is notified to the primary storage system 1000. Further, differential copy completion of the remote copy pairs wherein "differential copy startup feasible notification" is notified is awaited, and the parity group 1120 to which the secondary volume of this remote copy pair belongs is stopped.

Figure 31:
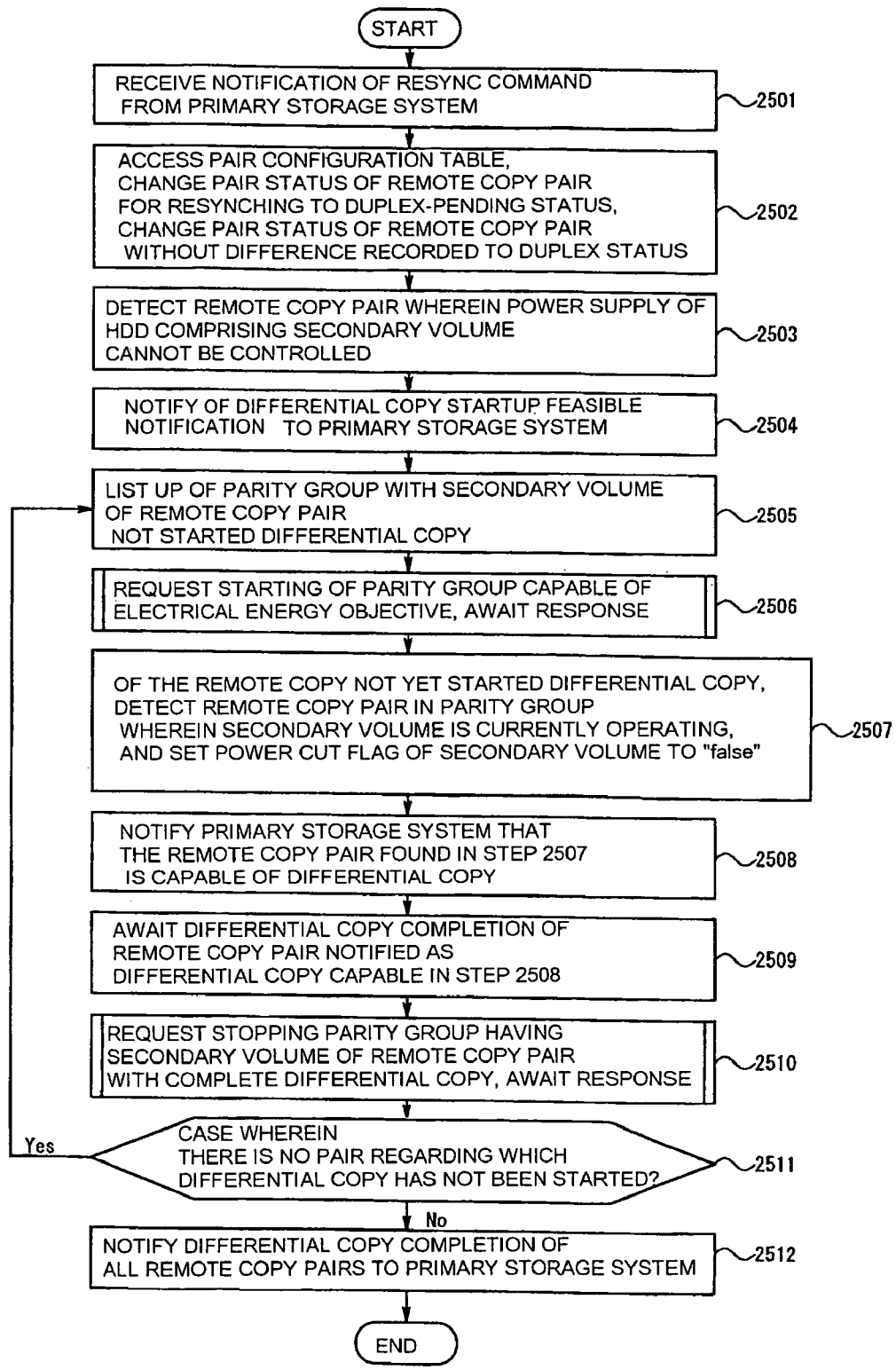
FIG. 31 is a diagram illustrating an example of the processing by the resync unit of the secondary storage system which considers power control.

FIG. 31 shows an example of the processing of the resync unit 128 of the secondary storage system 2000. The details of each step will be described below. The resync unit 128 receives notification of resync instructions for the remote copy pair from the primary storage system 1000 (step 2501). At this time, the information of one or more remote copy pairs and the information of one or more remote copy pairs wherein differences are not recorded are received as parameters.

Next, the resync unit 128 accesses the pair configuration table 1901 of the secondary storage system 2000, and changes the pair status of the remote copy pair to be resynchronized to Duplex-Pending status, and changes the pair status of the remote copy pair for which differences are not recorded to Duplex status (step 2502). At this stage, resynchronizing processing of remote copy pairs for which differences are not recorded in the difference management table 1093 of the primary storage system 1000 is ended.

Next, the resync unit 128 checks as to whether or not power control of the HDD 1060 comprising the secondary volume is feasible of the remote copy pairs to be resynchronized, which are received as parameters, and remote copy pairs for which power control of the HDD 1060 comprising the secondary volume is not feasible are listed (step 2503).

In the event that power control of the HDD 1060 comprising the secondary volume of the remote copy pair is not feasible, the resync unit 128 notifies the "differential copy startup feasible notification" of the remote copy pairs listed in step 2503 to the resync unit 128 of the primary storage system 1000, since the power supply of the HDD 1060 comprising the secondary volume is constantly ON (step 2504). From the above-mentioned notification, the differential copying of the remote copy pair wherein power control of the HDD 1060 comprising the secondary volume is not feasible is started by the differential copy unit 129 of the primary storage system 1000.

The resync unit 128 of the secondary storage system 2000 executes processing relating to the remote copy pairs wherein power control of the HDD 1060 comprising the secondary volume is feasible and differences is recorded. First, the resync unit 128 lists the parity groups which is in a stopped state, and has the secondary volumes of remote copy wherein differential copying is not yet started. Next, the resync unit 128 starts the parity groups 1120 which can be started with the electrical energy objective 1097.

Specifically, the active power of the parity groups 1120 is added up in order from the top of the list of the parity group 1120 acquired in step 2505. The active power of the parity groups 1120 are acquired from the parity group table 510, and if the total of the active power to that point is equal to or less than the electrical energy objective 1097, startup of this parity group 1120 is requested to the power control unit 1083. Also, if the total active power exceeds the electrical energy objective 1097, the processing for scanning the list of the parity group 1120 in order from the top is ended (step 2506). In calculating the active power, the active power for parity groups wherein power control is not feasible can be added.

When the startup of the parity group 1120 requesting startup in step 2506 is completed, the resync unit 128 acquires from the volume configuration table 500 the record 501 relating to the secondary volume of the remote copy pair wherein differential copying is not yet started, out of the remote copy pairs provided as parameters from the primary storage system 1000. Also, by referencing the parity group ID of the record 501, whether or not the secondary volume belongs to the started parity group 1120 is checked. In the event that the secondary volume belongs to the started parity group 1120, the power cut flag of the record 501 is changed to "false" (step 2507). Thus, that this secondary volume is using the started parity group 1120 is declared.

The resync unit 128 notifies the "differential copy startup feasible notification" of the remote copy pairs found in step 2507 to the resync unit 128 of the primary storage system 1000 (step 2508). At this time, the information of the remote copy pair found in step 2507 is provided as a parameter. From the above-mentioned notification, the differential copying of the remote copy pairs wherein the power supply of the HDD 1060 comprising the secondary volume if turned ON is started by the differential copy unit 129 of the primary storage system 1000.

Next, the resync unit 128 waits to complete the differential copying of the remote copy pair wherein differential copy startup feasibility is notified (step 2509). When the restore unit 125 of the secondary storage system 2000 changes the pair status of the remote copy pair for resynchronizing to Duplex, it is determined that the differential copying has been completed. The resync unit 128 requests stoppage of the parity group 1120, to which the secondary volume of the remote copy pair wherein differential copying is completed belongs, to the power control unit 1083, and awaits a response (step 2510).

When a response is received from the power control unit 1083, whether or not the differential copying of all of the remote copy pairs received as parameters from the resync unit 128 of the primary storage system 1000 has started is checked (step 2511). In the event that, of the remote copy pairs to be resynchronized which are received from the primary storage system 1000, there is a remote copy pair not having started differential copying, the process returns to step 2505 and repeats the steps thereafter. In this case, in step 2510, in order to stop the parity group 1120 to which the secondary volume of the remote copy pair wherein differential copying is completed belongs, another parity group 1120, to which a secondary volume of a remote copy pair wherein differential copying is not yet started belongs, can be started without exceeding the electrical energy objective 1097. Also, in the event that all differential copying is started in step 2511, the "differential copy completion notification" is notified to the resync unit 128 of the primary storage system 1000 and the process is ended (step 2512).

Thus, with the secondary storage system 2000, the parity groups 1120 to be started at once is limited to a fixed number, and differential copying of the remote copy pairs to which the secondary volumes belong to the started parity groups 1120 is processed. Accordingly, in the case of processing differential copying requiring a long time, having all of the parity groups 1120 started constantly is not necessary. Further, of the remote copy pairs to be resynchronized, controls can be in place so as to only start the parity groups 1120 to which the secondary volume of the remote copy pair, wherein differences are recorded, belongs.

Thus extension of longevity of the HDD 1060 comprising the secondary volume and reduced power consumption of the storage system can be realized. This processing can also be used in the case to newly create remote copy pairs.

In the event that the primary storage system 1000 receives a pair creation command for the remote copy pair from the calculator 200, the primary storage system 1000 copies all of the data stored in the primary volume into the secondary volume (initial copying). The creating process of the remote copy pair differs from the resync process in the following points.

(1) A record 700 relating to the newly created remote copy pair is added to the pair configuration table 1091.

(2) The primary volume and secondary volume are in a synchronous state, by copying all of the data stored in the primary volume into the secondary volume. (However, as noted previously, this is also called differential copying).

Figure 32:
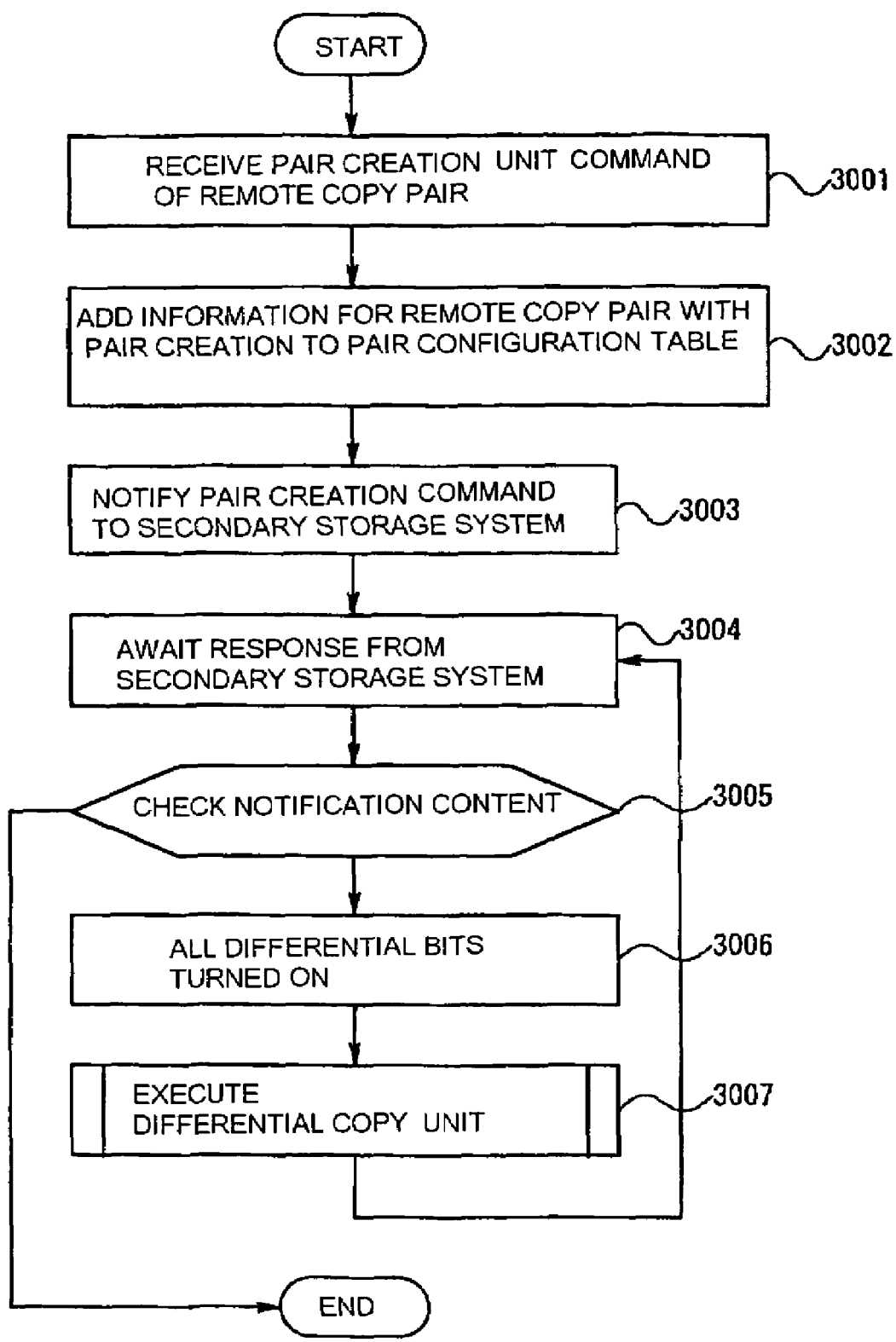
FIG. 32 is a diagram illustrating an example of the processing by the pair creation unit of the primary storage system which considers power control.

The processing in the event of applying the second embodiment of the invention to the creation of remote copy pairs will be described, focusing on the differences from the case of resynchronizing processing. FIG. 32 shows an example of the processing of the pair creation unit 126 operated with the primary storage system 1000.

First, the pair creation unit 126 of the primary storage system 1000 receives pair creation command for the remote copy pair from the calculator 200. At this time, the pair creation unit 126 of the primary storage system 1000 receives a primary volume ID, primary storage system ID, secondary volume ID, secondary storage system ID, and remote copy type from the calculator 200 as parameters (step 3001).

The pair creation unit 126 creates one record 700 as to one piece of information for the remote copy pair which is received as a parameter, and adds to the pair configuration table 1091 of the primary storage system 1000 (step 3002). The primary volume ID, secondary volume ID, and remote copy type are values provided as parameters. The counterpart storage system ID is set as the secondary storage system ID, and the pair status is set as "Duplex-Pending".

The pair creation command are notified to the pair creation unit 126 of the secondary storage system 2000. At this time, all of the parameters received from the calculator 200 are provided to the pair creation unit 126 in the secondary storage system 2000 (step 3003). With the processing for pair creation of a remote copy pair, all of the data stored in the primary volume is copied to the secondary volume. Therefore, the process described in resynchronizing the remote copy pairs, of checking whether or not the difference is recorded in the remote copy pair, becomes unnecessary.

Next, the pair creation unit 126 receives a response from the secondary storage system 2000 (step 3004), similar to step 2405 of the resync unit 128, and checks for response content (step 3005). The response content, as with the case of the resync unit 128, is either "differential copy completion notification" or "differential copy startup feasible notification". In the event that differential copy completion notification is received, the pair creation unit 126 ends the process, similar to the resync unit 128.

In the event that differential copy startup feasible notification is received, the pair creation unit 126 changes all of the differential bits for the difference management table 1093 of the remote copy pair notified from the secondary storage system 2000 to "on" (step 3006). Then the pair creation unit starts differential copying by calling the differential copy unit 129, similar to the resync unit 128. In step 3006, by changing all of the differential bits of the difference management table 1093 to "on", the differential copy unit 129 copies all of the data stored in the primary volume to the secondary volume.

Figure 33:
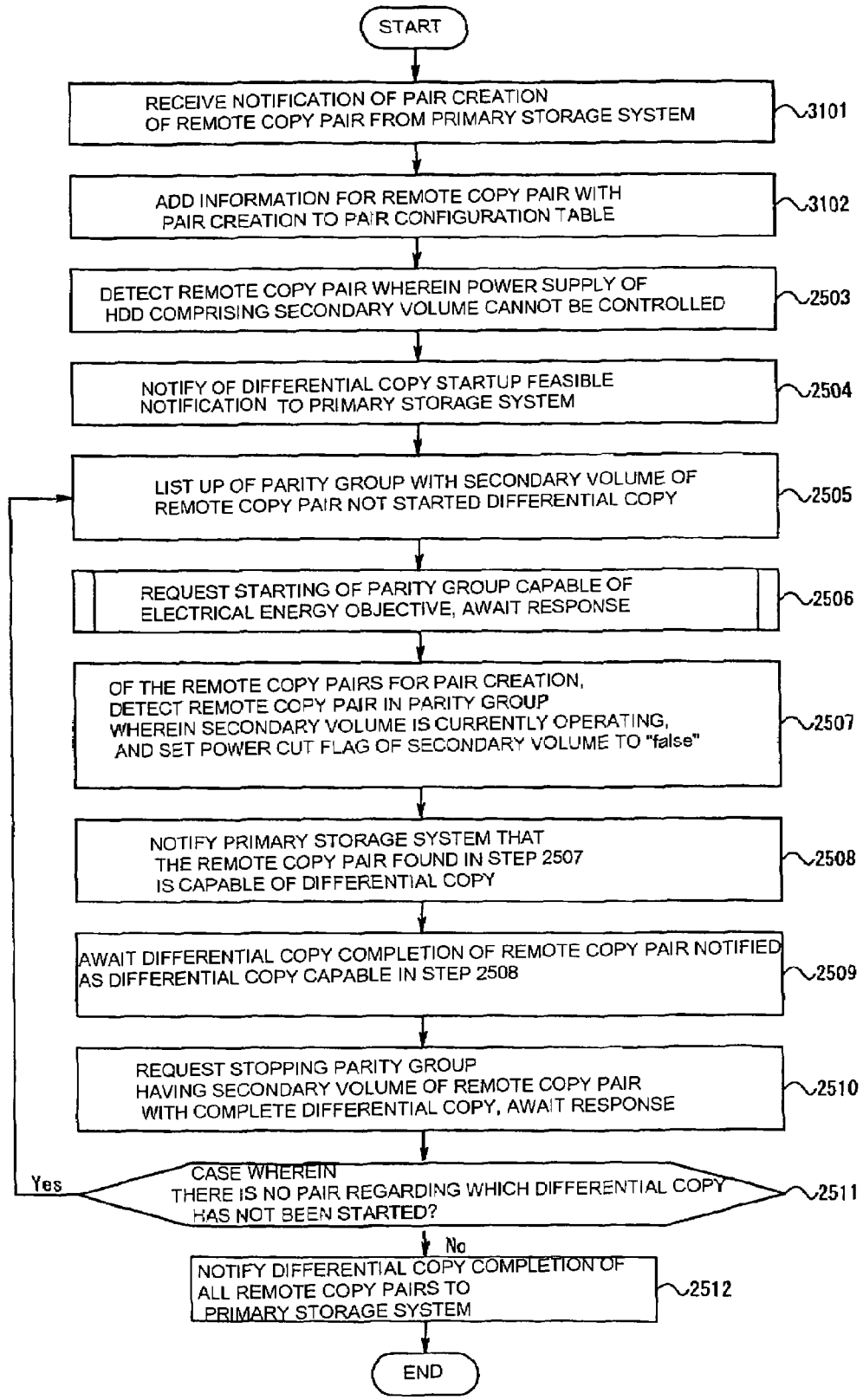
FIG. 33 is a diagram illustrating an example of the processing by the pair creation unit of the secondary storage system which considers power control.

FIG. 33 describes an example of the pair creation unit 126 which operates with the secondary storage system 2000. The pair creation unit 126 of the secondary storage system 2000 receives notification of pair creation command for the remote copy pair from the pair creation unit 126 of the primary storage system 1000. At this time, the primary volume ID, primary storage system ID, secondary volume ID, secondary storage system ID, and remote copy type are received as parameters (step 3101).

The pair creation unit 126 creates one record 700 as to one piece of information for the remote copy pair which is received as a parameter, and adds to the pair configuration table 1091 of the primary storage system 1000. The primary volume ID, secondary volume ID, and remote copy type are values received from the primary storage system 1000. The counterpart storage system ID is set as the primary storage system ID received from the primary storage system 1000, and the pair status is set as "Duplex-Pending" (step 3102).

Next, the next steps of the pair creation unit 126 will be described. Step 2503 and step 2504 are steps for deciding the remote copy pair for which power control of the secondary volume is not feasible, and for notifying differential copy startup feasibility to the primary storage system 1000. Further, step 2504 through step 2511 are steps for starting a fixed number of parity groups 1120 that can be started with the electrical energy objective 1097, and notifying the primary storage system of the differential copy startup feasibility of the remote copy pairs wherein the secondary volume belongs to this parity group 1120. These steps carry out the same processing as with step 2503 through step 2511 described with regard to the resync unit 128 of the secondary storage system 2000.

Thus, by coordinating the pair creation unit 126 of the primary storage system 1000 and the pair creation unit 126 of the secondary storage system 2000 and the power control unit 1083, differential copying is performed for the remote copy pair wherein pair creation is requested from the calculator 200, and the content of the primary volume and secondary volume can be in a synchronous state. Further, the points, such as limiting the number of parity groups 1120 which start at one time with the secondary storage system 2000, are similar to the resync unit 128. Accordingly, extension of longevity of the HDD 1060 comprising the secondary volume and reduced power consumption can be realized.

With the embodiment of the present invention, in deciding the number of parity groups 1120 to start, in addition to the electrical energy objective 1097, a transfer bandwidth of the network 260 between the primary storage system 1000 and secondary storage system 2000 can also be compared. In other words, the parity groups 1120 decided to start in step 2506 in FIG. 31 can be further selected with the method below.

(A) The transfer bandwidth for each of the parity groups 1120 selected in step 2506 is determined. This value can be found with the number of HDDs 1060 contained in the parity group 1120, or an administrator can input manually. Also, measurements can be performed internally in the primary storage system 1000 and secondary storage system 2000.

(B) With reference to the transfer bandwidth obtained in (A), the parity group 1120 is selected so as to fulfill the transfer bandwidth of the network 260, and also to use the least amount of active power. This selection can be made by adding up the transfer bandwidths of the parity groups 1120 listed in step 2505 from the top, and select the parity group 1120 that is added up to immediately following the added values exceeding the transfer bandwidth of the network 260.

With the power control using the processing features of asynchronous remote copying, during the time the remote copy unit 1082 has the pending-data 1300 accumulating in the pending-data storage unit 1094 every fixed amount of time, or after a fixed amount of accumulation, in other words, during the time that there is no access to the secondary volume, the power supply of the HDD 1060 comprising the secondary volume is turned OFF. Also, immediately prior to the remote copy unit 1082 writing the write data into the secondary volume, the parity group 1120 to which the secondary volume belongs is started, and by stopping the parity group 1120 immediately after the writing of the write data is completed, the HDD 1060 can have longevity increased and active power is lowered.

With the present embodiment, a case is described as an example wherein the copy-power cooperative unit 1084 of the secondary storage system 2000 has the pending-data 1300 accumulate in the pending-data storage unit 1094 of the secondary storage system 2000, and using the usage rate of the pending-data storage unit 1094 exceeding the previously set pending-data threshold 1098 as momentum, the write data is written into the secondary volume.

Figure 34:
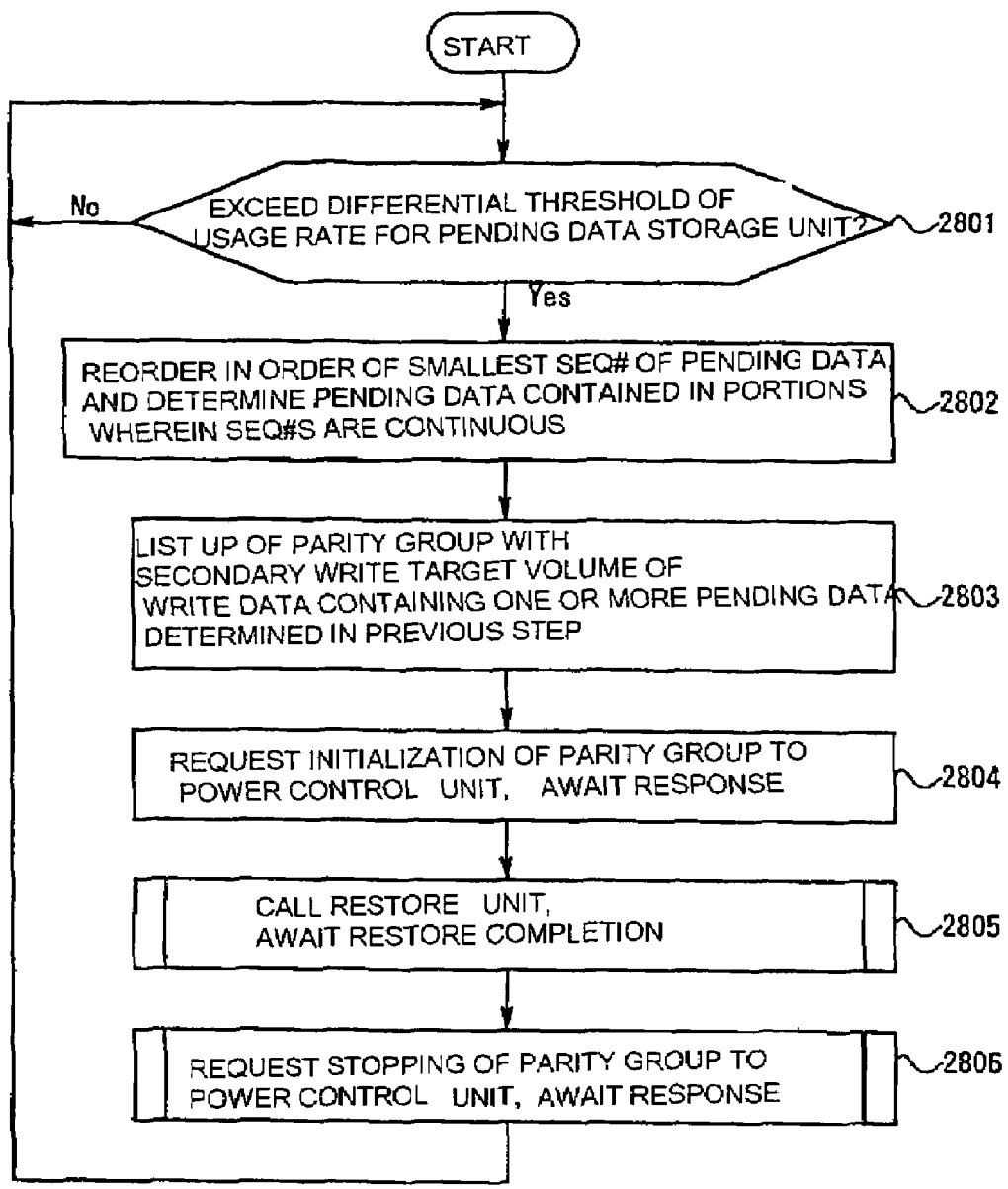
FIG. 34 is a diagram illustrating an example of the processing by the copy power control cooperative unit.

FIG. 34 shows an example of the processing of the copy-power cooperative unit 1084. The details of this process will be described below.

The copy-power cooperative unit 1084 compares the usage rate of the pending-data storage unit 1094 of the secondary storage system 2000 to the pending-data threshold 1098. If the usage rate of the pending-data storage unit 1094 exceeds that of the pending-data threshold 1098, the process advances to the next steps. If the usage of the pending-data storage unit 1094 does not exceed that of the pending-data threshold 1098, the process does not advance to the next step, but instead repeats the present step (step 2801). In the event that the usage rate of the pending-data storage unit 1094 does not exceed that of the pending-data threshold 1098, efficiency improvements can be performed, such as executing step 2801 again after the process has stopped for a fixed amount of time.

In the event that the usage rate of the pending-data storage unit 1094 does exceed that of the pending-data threshold 1098, the copy-power cooperative unit 1084 sorts the pending-data 1300 stored in the pending-data storage unit 1094 of the secondary storage system 2000 using the SEQ#, and further, the pending-data 1300 contained in the portion with continuous SEQ#s (in the event of placing in order the pending-data 1300 contained in a pending-data collection, the portion with no missing SEQ#s) is decided (step 2802).

Then the copy-power cooperative unit 1084 decides the secondary volume to write in the write data of the pending-data 1300 decided in the prior step 2802, and the parity groups 1120 to which this secondary volume belongs is listed. Specifically, a record 501 having the same value as the secondary volume ID contained in the pending-data 1300 is searched from the volume configuration table 500, and the parity group ID thereof is listed (step 2803).

The copy-power cooperative unit 1084 requests the power control unit 1083 to start the parity groups 1120 listed in the prior step 2803, and awaits a response from the power control unit 1083 (step 2804).

Next, the copy-power cooperative unit 1084 starts the restore unit 125, and waits for restore unit 125 to write the write data of all of the pending-data 1300 decided in step 2802 into the secondary volume (step 2805). This can be done by observing that the restore unit 125 has ended the processing, or by observing the usage rate of the pending-data storage unit 1094, or by notifying the restore unit 125.

Next, the copy-power cooperative unit 1084 requests the power control unit 1083 to stop the parity group 1120 which was started in step 2804, and awaits a response from the power control unit 1083 (step 2806).

Thus, even in the event that the remote copy unit 1082 is controlled so as to have a fixed amount of pending-data 1300 accumulated in the pending-data storage unit 1094 of the secondary storage system 2000, and to write the write data of the pending-data 1300 into the secondary volume when the usage rate of the pending-data storage unit 1094 exceeds that of the pending-data threshold 1098, the startup of the HDD 1060 can be limited to only when the write data is actually being written into the secondary volume. Accordingly, extension of longevity of the HDD 1060 comprising the secondary volume and reduced power consumption of the storage system can be realized.

In the description of the third embodiment of the present invention, it was stated that the write data is written into the secondary volume, based on usage rate of the pending-data storage unit 1094 of the secondary storage system 2000. However, the write data can be written into the secondary volume based on time instead of usage rate of the pending-data storage unit 1094. Thus, the timing for writing the write data into the secondary volume is not limited to the example used in the present description.

Now, although not shown in the drawings, the primary storage system 1000 can have not only a secondary storage system 2000 with power control feasibility, but also can have a normal storage system without power control to serve as the secondary storage system 2000, therefore before executing the above-described processing, querying as to whether the secondary storage system 2000 will have power control feasibility, and execute the process which is coordinated with the power control, according to the results thereof.

Also, with the embodiment of the present invention, the primary volume and the secondary volume are contained in separate storage systems, but they can be contained in the same storage system, and instead of remote copying, local copying can be applied. Further, the embodiment of the present invention can be applied in the event that the primary storage system 1000 has power control feasibility. For example, in the event that a resync operation is received, only power control for the secondary storage system 2000 is performed with the above description, but additionally turning the power supply ON for the HDD 1060 comprising the primary volume of the (remote or local) copy pair can be performed simultaneously.

Second Embodiment

In the first embodiment, a method has been described for limiting the number of parity groups 1120 that the remote copy unit 1082 start at once to a fixed number with the secondary storage system 2000, in the event that differential copying for a remote copy pair is executed.

In the second embodiment, a method is described for ignoring the electrical energy objective 1097 and preferring the speed of differential copying in the event of a failure occurring or in an emergency.

Generally, when a failure occurs in the calculator 200 or the primary storage system 1000, the data stored in the secondary storage system 2000 is used to continue with business processing. Accordingly, in the event that a failure occurs in the calculator 200 or in a portion of the primary storage system 1000, the method of starting only a fixed number of parity groups at one time and performing differential copying, or the method of stopping the restore unit 125 for a fixed amount of time is time-consuming.

Here, a failure in a portion of the primary storage system 1000 refers to the state wherein the primary storage system 1000 can copy data to the secondary storage system 2000.

Figure 35:
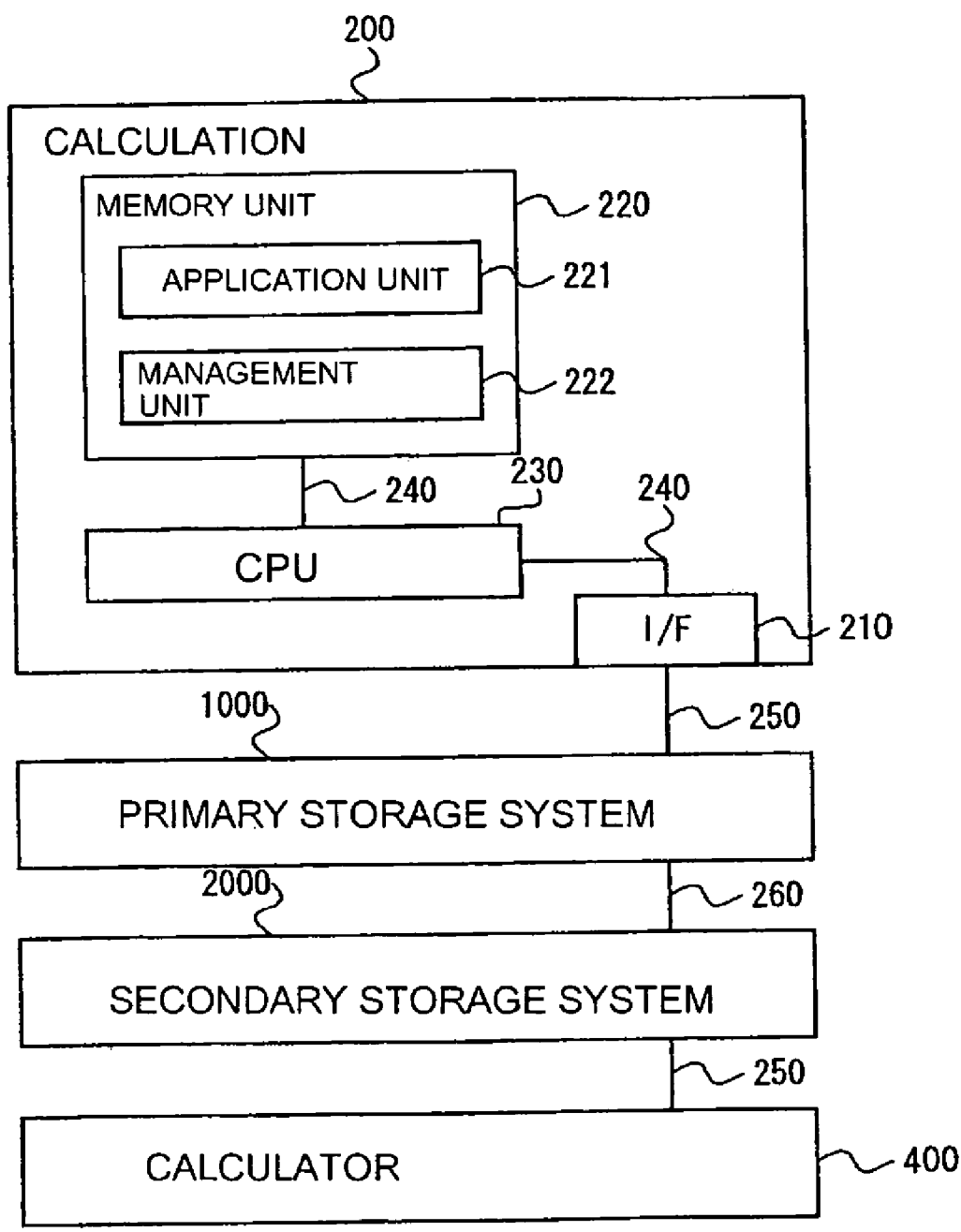
FIG. 35 is a diagram of a configuration of an information processing system and an example of a configuration of a calculator according to a second embodiment of the present invention.

With the second embodiment, as illustrated in FIG. 35, a calculator 400 is placed for the purpose of continuing with business in the case of a failure occurring, which is connected to the secondary storage system 2000 using the network 250. The configuration of the calculator 400 is the same as that of the calculator 200. The secondary storage system 2000 is also provided with an I/F 1010 for receiving I/O from the calculator 400.

Also, in the event of a failure occurring in the calculator 200 or in a portion of the primary storage system 1000 during differential copying, the calculator 400 instructs the secondary storage system 2000 to ignore the electrical energy objective 1097 and to perform differential copying. Hereafter, this will be called "high-speed differential copy command".

Figure 36:
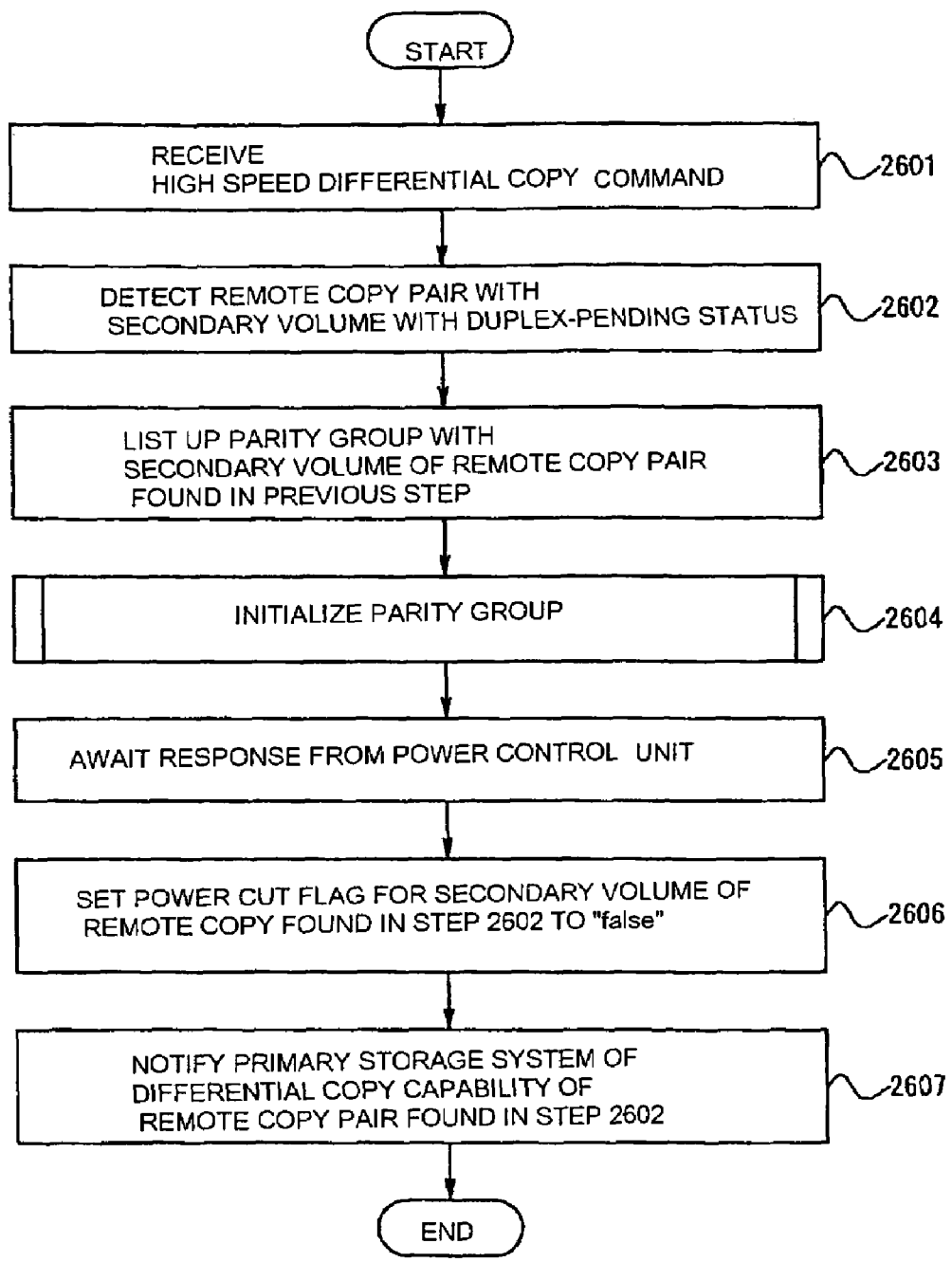
FIG. 36 is a diagram illustrating an example of the processing by the secondary storage system which received the high speed differential copy request.

FIG. 36 shows an example of the processing executed by the secondary storage system 2000 which receives the request for high-speed differential copying.

The secondary storage system 2000 receives high-speed differential copy command from the calculator 400 (step 2601). Then the secondary storage system 2000 references the pair configuration table 1091 of the secondary storage system 2000 and searches for a remote copy pair wherein the pair status is Duplex-Pending status (step 2602).

Next, the secondary storage system 2000 lists the parity groups 1120 to which the secondary volume of the remote copy pair found in step 2602 belongs. Specifically, a record 501 having the same value as the secondary volume ID is searched for the volume management table 500, and the parity group ID thereof is listed (step 2603).

The secondary storage system 2000 requests the power control unit 1083 to start the listed parity group 1120 (step 2604), and awaits a response from the power control unit 1083 (step 2605).

Also, the secondary storage system 2000 searches a record 501 relating to the secondary volume of the remote copy pair found in step 2602 from the volume management table 500, and changes the power cut flag of this record 501 to "false". Lastly, the secondary storage system 2000 notifies the primary storage system 1000 of the differential copy feasibility of the remote copy pair found in step 2602.

The operation of the primary storage system 1000 receiving notice of the differential copy feasibility has been described in the resync unit 128 and the pair creation unit 126.

Thus, in the event that a failure occurs in the calculator 200 or in a portion of the primary storage system 1000, any data loss resulting from being unable to copy from the primary storage system 1000 to the secondary storage system 2000 is kept at a minimum, by hurrying with differential copying.

What is claimed is:

1. An information processing system comprising:
an information processing device;
a first storage system having a first volume, said first storage system being connected to said information processing device;
a second storage system having a second volume, said second storage system being connected to said first storage system;
wherein, in an information processing system which performs remote copying from said first volume to said second volume, power control is performed relating to said second volume by coordinating with a remote copy process from said first storage system to said second storage system, said second storage system having a pending-data storage unit, and performing remote copying of pending data as to said first volume to said pending-data storage unit of a second storage system;
wherein power reduction relating to said second volume is instructed after a restore process of the pending-data copied to said pending-data storage unit to said second volume is completed, when said coordinated remote copy process is a remote copy stopping instruction process.

2. An information processing system according to Claim 1, wherein power control is performed relating to said second volume by coordinating with a remote copy process from said first storage system to said second storage system, according to remote copying process instructions from said information processing device to said first storage system.

3. An information processing system according to Claim 1, having a second information processing device connected to said second storage system, and performing power control relating to said second volume by coordinating with a remote copy process from said first storage system to said second storage system, according to remote copying process instructions from said second information processing device to said second storage system.

4. An information processing system according to claim 1, wherein said first storage system notifies remote copy stopping instructions to said second storage system when said coordinated remote copying process is a remote copy stopping instruction process.

5. An information processing system according to claim 1, wherein said first storage system further has a third volume; and wherein said second storage system further has a fourth volume;
and wherein remote copying is performed from said third volume to said fourth volume;
and wherein, when said coordinated remote copying process is a creating copy process of remote copying from said first volume to said second volume and remote copying from said third volume and fourth volume, power reduction of said second volume is removed and the first copying is performed, and after said first copying is completed the power reduction of said second volume is instructed, and the power reduction of said fourth volume is removed and the second copying from said third volume to said fourth volume is performed.

6. An information processing system according to claim 5, wherein the first copying which removes power reduction of said second volume and performs copying is a first differential copy, and the second copying which removes power reduction of said fourth volume and performs copying is a second differential copy.

7. An information processing system according to claim 6, wherein the instructions for removing power reduction of said second volume and said fourth volume is performed with consideration for a network bandwidth between said first storage system and said second storage system.

8. An information processing system comprising:
an information processing device;
a first storage system having a first volume, said first storage system being connected to said information processing device;
a second storage system having a second volume, said second storage system being connected to said first storage system;
wherein, in an information processing system which performs remote copying from said first volume to said second volume, power control is performed relating to said second volume by coordinating with a remote copy process from said first storage system to said second storage system,
said second storage system having a pending-data storage unit, and performing remote copying of pending data as to said first volume to said pending-data storage unit of a second storage system;
wherein power reduction relating to said second volume is instructed as to said second volume during a pause of a restore process when said coordinated remote copy process is a restore process reflecting the pending data of said pending-data storage unit to said second volume.

9. The secondary storage system connected to a primary storage system providing a first volume connected to an information processing device, and a secondary storage system having a second volume,
  wherein power control is performed relating to said second volume by coordinating with a remote copy process from said primary storage system to said secondary storage system, when remote copying is executed from said first volume to said second volume, wherein:
  said secondary storage system having a pending-data storage unit, and
  performing remote copying of pending data as to said first volume to said pending-data storage unit of a second storage system;
    wherein power reduction relating to said second volume is instructed after a restore process of the pending-data copied to said pending-data storage unit to said second volume is completed, when said coordinated remote copy process is stopping a remote copy stopping instruction process.

10. The secondary storage system according to claim 9, wherein power reduction instructions are performed according to a notification of remote copy from said primary storage system to said secondary storage system, when said coordinated remote copy process is a remote copy stopping instruction process.

11. The secondary storage system according to claim 9, wherein said primary storage system further has a third volume;
  and wherein said secondary storage system further has a fourth volume;
  and wherein remote copying is performed from said third volume to said fourth volume;
    and wherein, when said coordinated remote copying process is a creating copy process of remote copying from said first volume to said second volume and remote copying from said third volume and fourth volume, power reduction of said second volume is removed and the first copying is performed, and after said first copying is completed the power reduction of said second volume is instructed, and the power reduction of said fourth volume is removed and the second copying from said third volume to said fourth volume is performed.

12. The secondary storage system according to claim 11, wherein said first copying which removes power reduction of said second volume and performs copying is a first differential copy, and the second copying which removes power reduction of said fourth volume and performs copying is a second differential copy.

13. The secondary storage system according to claim 12, wherein the instructions for removing power reduction of said second volume and said fourth volume is performed with consideration for a network bandwidth between said primary storage system and said secondary storage system.

14. A secondary storage system connected to a primary storage system providing a first volume connected to an information processing device, and a secondary storage system having a second volume,
  wherein power control is performed relating to said second volume by coordinating with a remote copy process from said primary storage system to said secondary storage system, when remote copying is executed from said first volume to said second volume,
  wherein said secondary storage system has a pending-data storage unit, and performs remote copying of pending-data as to said first volume to said pending-data storage unit of a secondary storage system;
  and wherein power reduction is instructed as to said second volume during a pause of a restore process when said coordinated remote copy process is a restore process reflecting the pending data of said pending-data storage unit to said second volume.

15. An information processing system comprising:
  an information processing device;
  a first storage system having a first volume and a third volume and a first controller, said first storage system being coupled to said information processing device; and
  a second storage system having a second volume and a fourth volume and a second controller, said second storage system being coupled to said first storage system;
  wherein, when said second volume is not used, power reduction of the second volume is performed;
  wherein, when said fourth volume is not used, power reduction of the fourth volume is performed; and
  wherein, when instructions for first remote copying from said first volume to said second volume and second remote copying from said third volume to said fourth volume are received, and power consumption exceeds a predetermined threshold if said first remote copying and said second remote copying are performed simultaneously, said second remote copying is performed after completion of said first remote copying.

16. An information processing system according to claim 15,
  wherein said first remote copying and second remote copying are creating copy or differential copy.

17. An information processing system according to claim 16,
  wherein, when instructions of first remote copying from said first volume to said second volume and second remote copying from said third volume and fourth volume are received, and used capacity of network exceeds a threshold by said first remote copying and said second copying, said second remote copy is performed after completion of said first remote copy.

18. An information processing system comprising:
  an information processing device;
  a primary storage system having a first volume and a third volume and a first controller, said first primary system being coupled to said information processing device; and
  a secondary storage system having a second volume and a fourth volume and a second controller, said secondary storage system being coupled to said first storage system;
  wherein, when said second volume is not used, power reduction of the second volume is performed;
  wherein, when said fourth volume is not used, power reduction of the fourth volume is performed; and
  wherein, when instructions for first remote copying from said first volume to said second volume and second remote copying from said third volume to said fourth volume are received, and power consumption exceeds a predetermined threshold if said first remote copying and said second remote copying are performed simultaneously, said second remote copying is performed after completion of said first remote copying.

19. An information processing system according to claim 18,
  wherein said first remote copying and second remote copying are creating copy or differential copy.

20. An information processing system according to claim 19,
wherein, when instructions of first remote copying from said first volume to said second volume and second remote copying from said third volume and fourth volume are received, and used capacity of network exceeds a threshold by said first remote copying and said second copying, said second remote copy is performed after completion of said first remote copy.

* * * * *